(12) United States Patent
Nakatani et al.

(10) Patent No.: US 7,068,440 B1
(45) Date of Patent: Jun. 27, 2006

(54) VARIABLE MAGNIFICATION OPTICAL SYSTEM

(75) Inventors: Toru Nakatani, Sakai (JP); Mamoru Terada, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/114,772

(22) Filed: Apr. 25, 2005

(30) Foreign Application Priority Data

Jan. 12, 2005 (JP) .............................. 2005-005343

(51) Int. Cl.
*G02B 15/14* (2006.01)
*G02B 17/00* (2006.01)

(52) U.S. Cl. ...................... 359/676; 359/678; 359/726

(58) Field of Classification Search ........ 359/676–692, 359/726
See application file for complete search history.

(56) References Cited

U.S. PATENT DOCUMENTS 6,671,461 B1 * 12/2003 Tochigi ...................... 396/379

6,754,446 B1 * 6/2004 Hagimori et al. ............. 396/72

FOREIGN PATENT DOCUMENTS

JP          2004-170707 A          6/2004

* cited by examiner

*Primary Examiner*—Scott J. Sugarman
*Assistant Examiner*—M. Hasan
(74) *Attorney, Agent, or Firm*—Sidley Austin LLP

(57) ABSTRACT

The present invention provides a variable magnification optical system for forming an optical image of an object on the light-receiving surface of an image sensor with a variable magnification. The variable magnification optical system includes an optical construction comprising, from an object side, a first reflective surface, a first movable unit, a second reflective surface, and a second movable unit. The optical axis is bent at substantially ninety degrees by the first reflective surface and is further bent by the second reflective surface, and, during magnification variation from the wide-angle end to the telephoto end, the first and second reflective surfaces are kept in fixed positions with respect to the image surface, and the first and second movable units move along the optical axis. The variable magnification optical system fulfills a prescribed conditional formula.

20 Claims, 12 Drawing Sheets

FNO=3.27

(W)

d
g
c
SC

-0.1    0.1
SPHERICAL  SINE
ABERRATION CONDITION

Y'=3.6

--- DM
— DS

-0.1    0.1
ASTIGMATISM

Y'=3.6

-5.0    5.0
DISTORTION %

FNO=3.51

(M)

d
g
c
SC

-0.1    0.1
SPHERICAL  SINE
ABERRATION CONDITION

Y'=3.6

--- DM
— DS

-0.1    0.1
ASTIGMATISM

Y'=3.6

-5.0    5.0
DISTORTION %

FNO=3.60

(T)

d
g
c
SC

-0.1    0.1
SPHERICAL  SINE
ABERRATION CONDITION

Y'=3.6

--- DM
— DS

-0.1    0.1
ASTIGMATISM

Y'=3.6

-5.0    5.0
DISTORTION %

FIG.7A
FNO=2.80
(W)
— d
— — g
— · — c
— — — SC
SPHERICAL ABERRATION  SINE CONDITION
FIG.7B
Y'=4.5
— — — DM
——— DS
ASTIGMATISM
FIG.7C
Y'=4.5
DISTORTION %
FIG.7D
FNO=3.60
(M)
— d
— — g
— · — c
— — — SC
SPHERICAL ABERRATION  SINE CONDITION
FIG.7E
Y'=4.5
— — — DM
——— DS
ASTIGMATISM
FIG.7F
Y'=4.5
DISTORTION %
FIG.7G
FNO=4.90
(T)
— d
— — g
— · — c
— — — SC
SPHERICAL ABERRATION  SINE CONDITION
FIG.7H
Y'=4.5
— — — DM
——— DS
ASTIGMATISM
FIG.7I
Y'=4.5
DISTORTION %
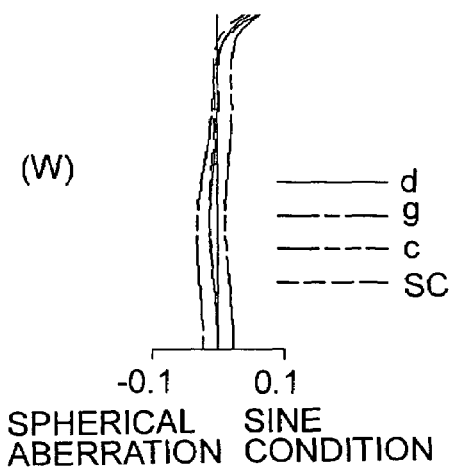
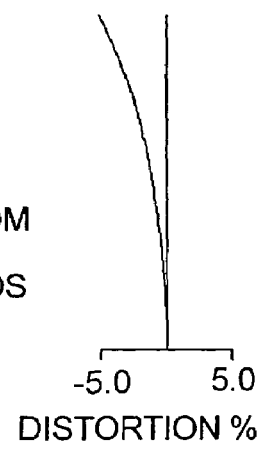
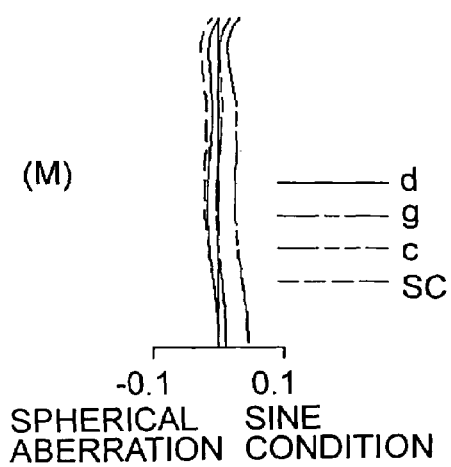
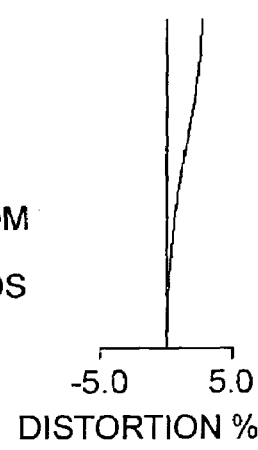
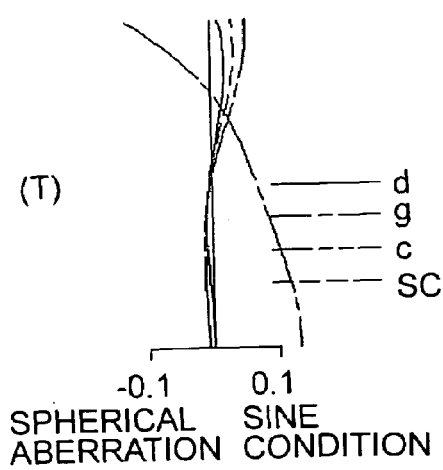
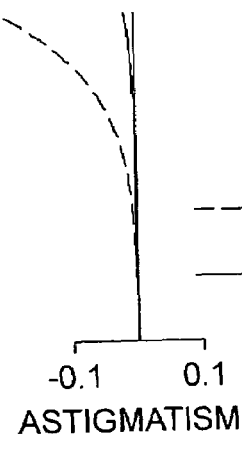
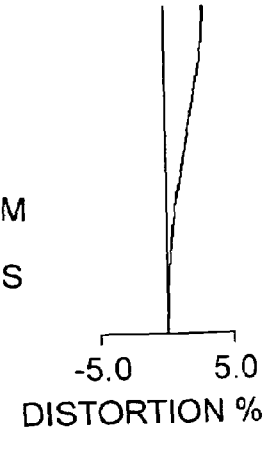

FIG.8A
FNO=2.80
FIG.8B
Y'=4.5
FIG.8C
Y'=4.5
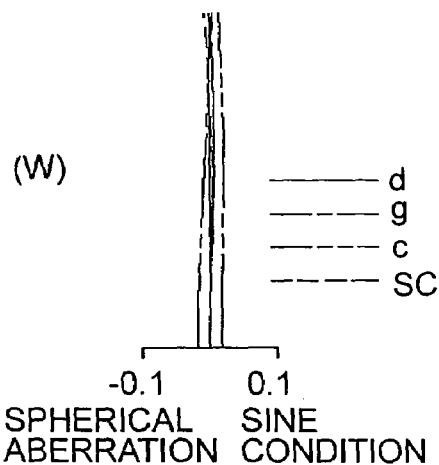
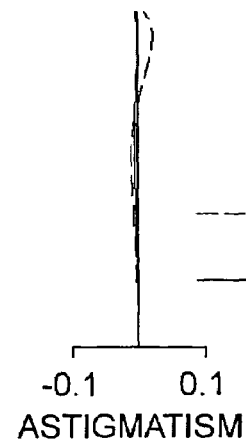
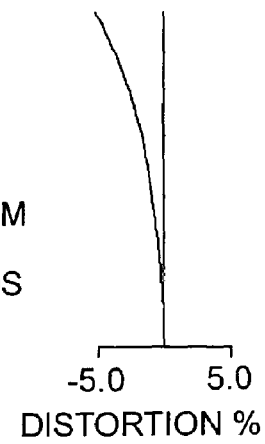
(W)
SPHERICAL ABERRATION   SINE CONDITION
ASTIGMATISM
DISTORTION %
FIG.8D
FNO=3.60
FIG.8E
Y'=4.5
FIG.8F
Y'=4.5
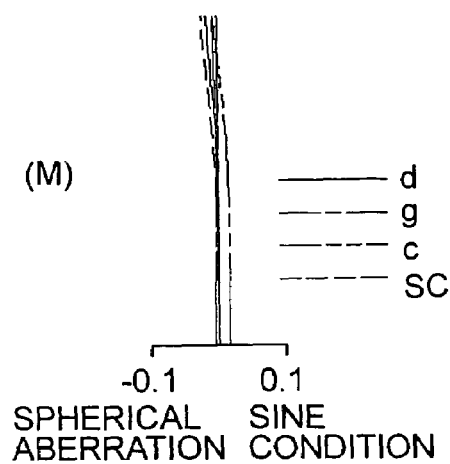
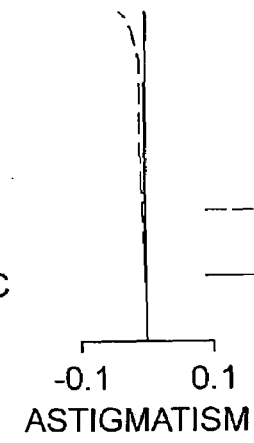
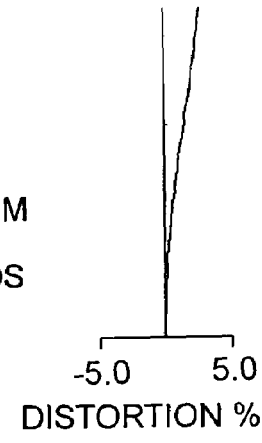
(M)
SPHERICAL ABERRATION   SINE CONDITION
ASTIGMATISM
DISTORTION %
FIG.8G
FNO=4.90
FIG.8H
Y'=4.5
FIG.8I
Y'=4.5
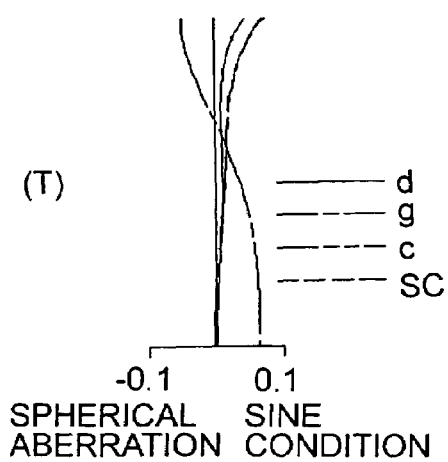
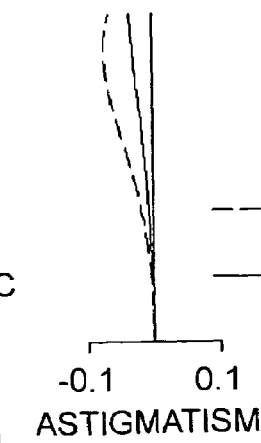
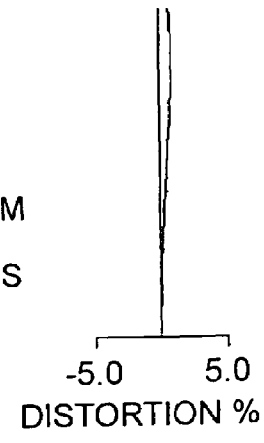
(T)
SPHERICAL ABERRATION   SINE CONDITION
ASTIGMATISM
DISTORTION %

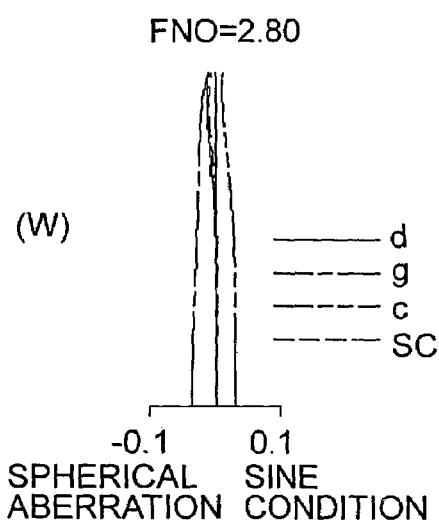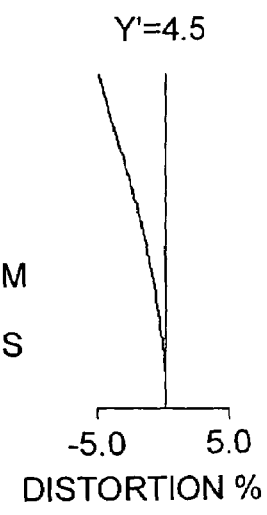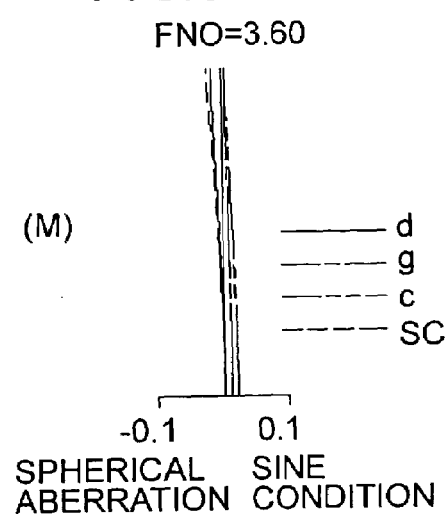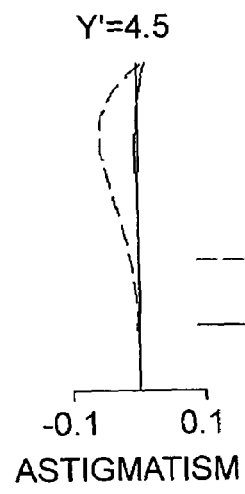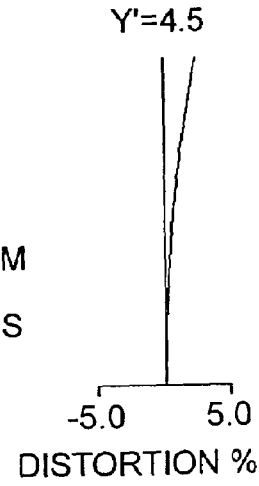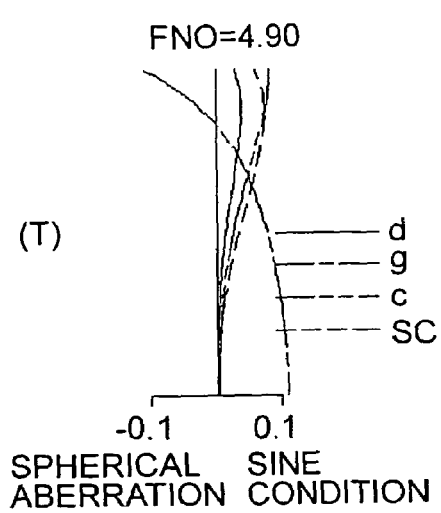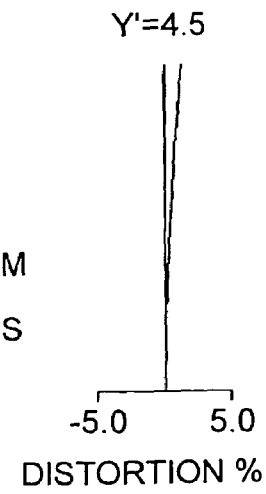

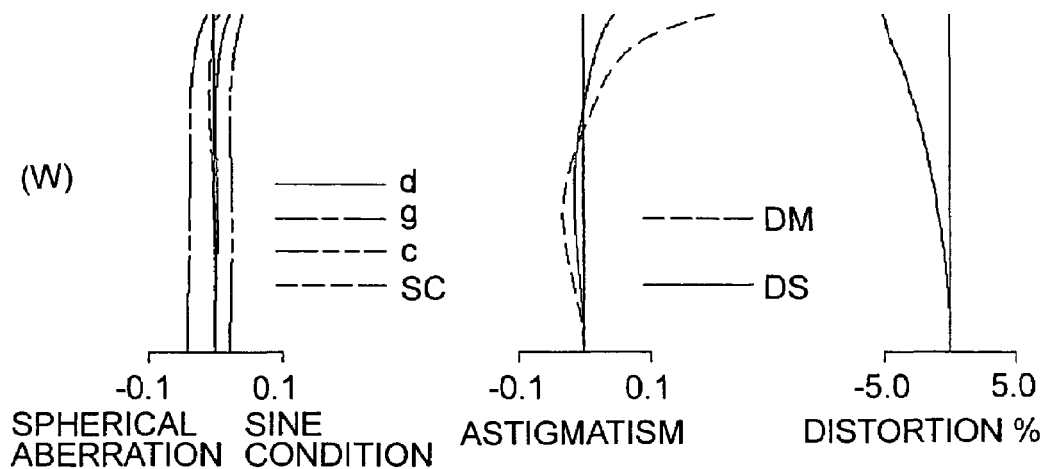

VARIABLE MAGNIFICATION OPTICAL SYSTEM

This application is based on Japanese Patent Application No. 2005-005343 filed on Jan. 12, 2005, the contents of which are hereby incorporated by reference.

BACKGROUND OF THE INVENTION

1. Field of the Invention

The present invention relates to a variable magnification optical system, for example, a variable magnification optical system suitable for a digital camera and a digital appliance provided with an image input capability that take in an image of a subject by an image sensor (especially a compact zoom lens system that offers high magnification variation ratios), and to an image-taking apparatus provided with such as a variable magnification optical system.

2. Description of Related Art

In recent years, as personal computers become increasingly widespread, digital cameras which permit easy acquisition of images have been becoming more and more popular. Consequently, there has been a demand for a more compact, thinner digital camera, which leads to a demand for an even more compact image-taking lens system. Due to the yearly increasing trend of the number of pixels included in the image sensor, the image-taking lens system has been required to offer high optical performance so as to catch up with the increase in the number of pixels included in the image sensor. Even in digital cameras designed for general consumers, magnification variation of an image, optical magnification variation with little image degradation in particular, is sought. Thus, in order to meet the demand for downsizing with higher performance and higher magnification variation ratios, various types of conventional zoom lens systems have been suggested (see Patent document 1, for example).

[Patent Document 1] Japanese Patent Application Laid-open No. 2004-170707

However, the suggested conventional zoom lens systems have difficulty in meeting the mutually contradictory demands for downsizing with higher performance and higher magnification variation ratio. For example, in the conventional zoom lens system suggested in the patent document 1, an optical path is bent twice so as to provide a zoom ratio of about 5 or more while suppressing the height and width of the camera. Considering the balance with the optical performance, however, the zoom lens system is not sufficiently downsized.

SUMMARY OF THE INVENTION

In view of the above-mentioned problem, it is an object of the present invention to provide a compact variable magnification optical system that offers high-performance and high magnification variation ratios and an image-taking apparatus provided with such a variable magnification optical system.

To achieve the above object, in one aspect of the present invention, a variable magnification optical system for forming an optical image of an object on the light-receiving surface of an image sensor with a variable magnification includes an optical construction having, from an object side, a first reflective surface, a first movable unit, a second reflective surface, and a second movable unit. The optical axis is bent at substantially ninety degrees by the first reflective surface and is further bent by the second reflective surface. During magnification variation from the wide-angle end to the telephoto end, the first and second reflective surfaces are kept in fixed positions with respect to the image surface, and the first and second movable units move along the optical axis. Here, conditional formula (1) below is fulfilled:

$$1.0 < TR12/y'\max < 12.5 \quad (1)$$

where

TR12 represents the distance along the optical axis between the first and second reflective surfaces, and y'max represents the maximum image height.

In another aspect of the present invention, an image-taking apparatus is provided with a variable magnification optical system for forming an optical image of an object with a variable magnification; and an image sensor for converting the optical image into an electrical signal. The variable magnification optical system includes an optical construction having, from the object side, a first reflective surface, a first movable unit, a second reflective surface, and a second movable unit. The optical axis is bent at substantially ninety degrees by the first reflective surface and is further bent by the second reflective surface. During magnification variation from the wide-angle end to the telephoto end, the first and second reflective surfaces are kept in fixed positions with respect to the image surface, and the first and second movable units move along the optical axis. Here, conditional formula (1) below is fulfilled:

$$1.0 < TR12/y'\max < 12.5 \quad (1)$$

where

TR12 represents the distance along the optical axis between the first and second reflective surfaces, and y'max represents the maximum image height.

In still another aspect of the present invention, a camera is provided with an image-taking apparatus for optically taking in an image of a subject and then outputting an electrical signal. The image-taking apparatus includes: a variable magnification optical system for forming an optical image of an object with a variable magnification; and an image sensor for converting the optical image into an electrical signal. The variable magnification optical system includes an optical construction having, from an object side, a first reflective surface, a first movable unit, a second reflective surface, and a second movable unit. The optical axis is bent at substantially ninety degrees by the first reflective surface and is further bent by the second reflective surface. During magnification variation from the wide-angle end to the telephoto end, the first and second reflective surfaces are kept in fixed positions with respect to the image surface, and the first and second movable units move along the optical axis. Here, conditional formula (1) below is fulfilled:

$$1.0 < TR12/y'\max < 12.5 \quad (1)$$

where

TR12 represents a distance along the optical axis between the first and second reflective surfaces, and y'max represents a maximum image height.

According to the present invention, in the variable magnification optical system having the optical construction including, from the object side, the first reflective surface, the first movable unit, the second reflective surface, and the second movable unit, the distance between the first and second reflective surfaces satisfies the predetermined condition. Therefore, the variable magnification optical system can be downsized while maintaining high optical performance and high magnification variation ratios, thus permitting achieving an image-taking apparatus provided with a compact variable magnification optical system that offers high optical performance and high magnification variation ratios. Further, the use of the image-taking apparatus according to the present invention in a digital camera and a portable data device can contribute to slimming-down, weight saving, downsizing, and cost reduction of these devices with higher performance and higher functions.

BRIEF DESCRIPTION OF THE DRAWINGS

FIGS. 7A to 6I are aberration diagrams of Example 2;

FIGS. 8A to 8I are aberration diagrams of Example 3;

FIGS. 9A to 9I are aberration diagrams of Example 4;

FIGS. 10A to 10I are aberration diagrams of Example 5;

DETAILED DESCRIPTION OF PREFERRED EMBODIMENTS

Hereinafter, a variable magnification optical system, an image-taking apparatus, and the like embodying the present invention will be described with reference to the drawings. The image-taking apparatus according to the present invention is an optical apparatus that optically takes in an image of a subject and then outputs it in the form of an electrical signal. Such an image-taking apparatus is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital appliances. As these examples show, by the use of an image-taking apparatus, it is possible not only to build a camera but also to incorporate an image-taking apparatus in various devices to provide them with a camera capability. For example, it is possible to realize a digital appliance provided with an image input capability, such as a cellular phone furnished with a camera.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit exchange of images, including both those connected directly to a network and those connected to a network by way of a device, such as a personal computer, having an information processing capability).

Figure 1:
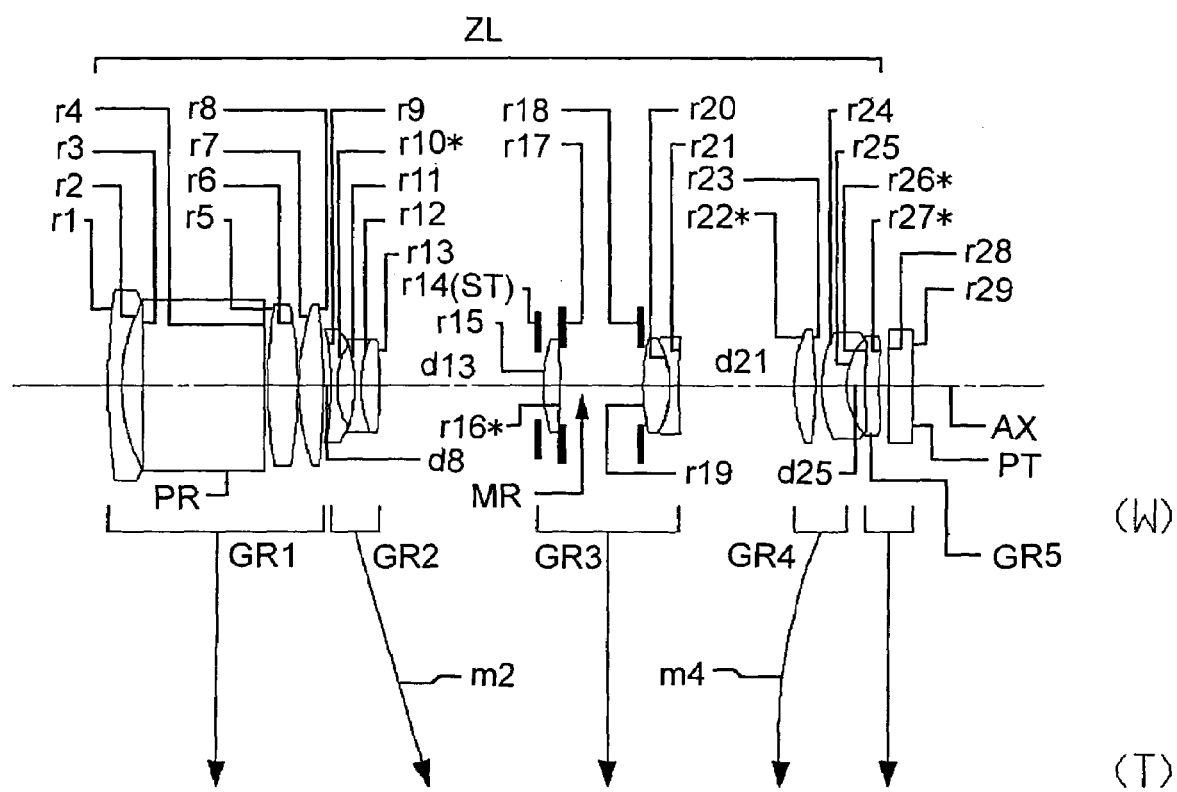
FIG. 1 is a lens construction diagram of a first embodiment (Example 1) according to the present invention.
Figure 2:
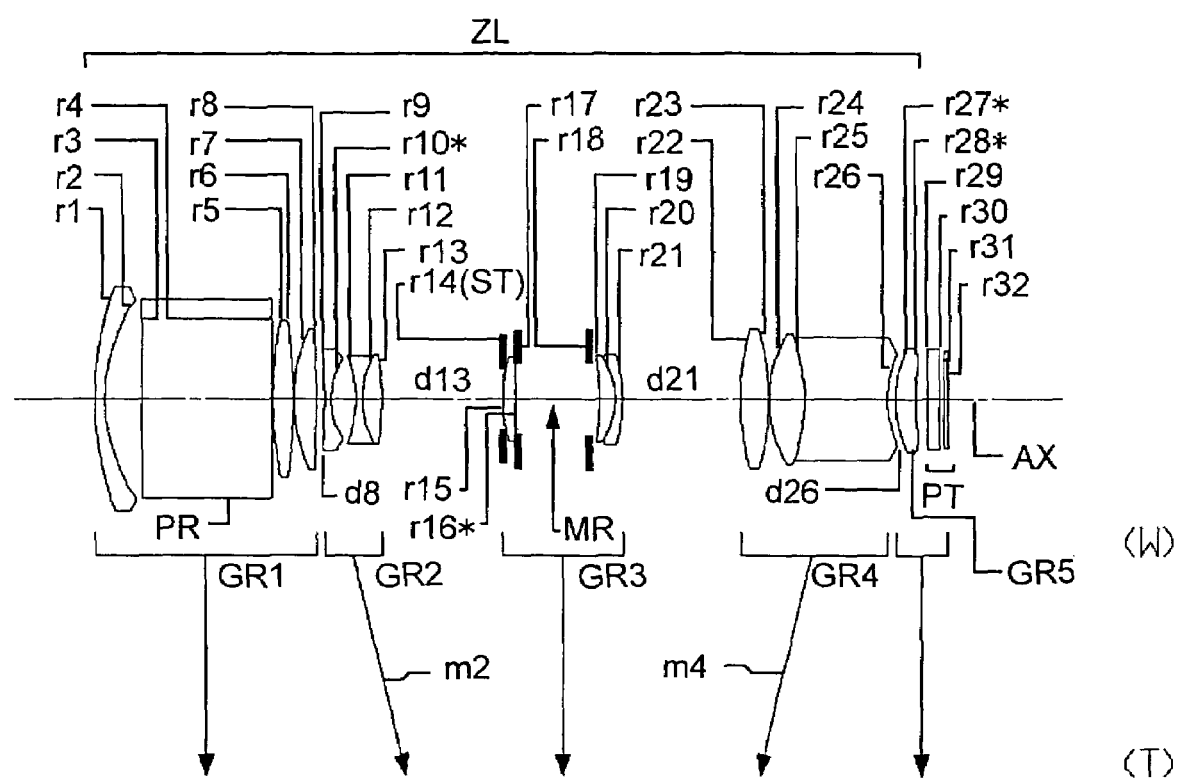
FIG. 2 is a lens construction diagram of a second embodiment (Example 2) according to the present invention.
Figure 3:
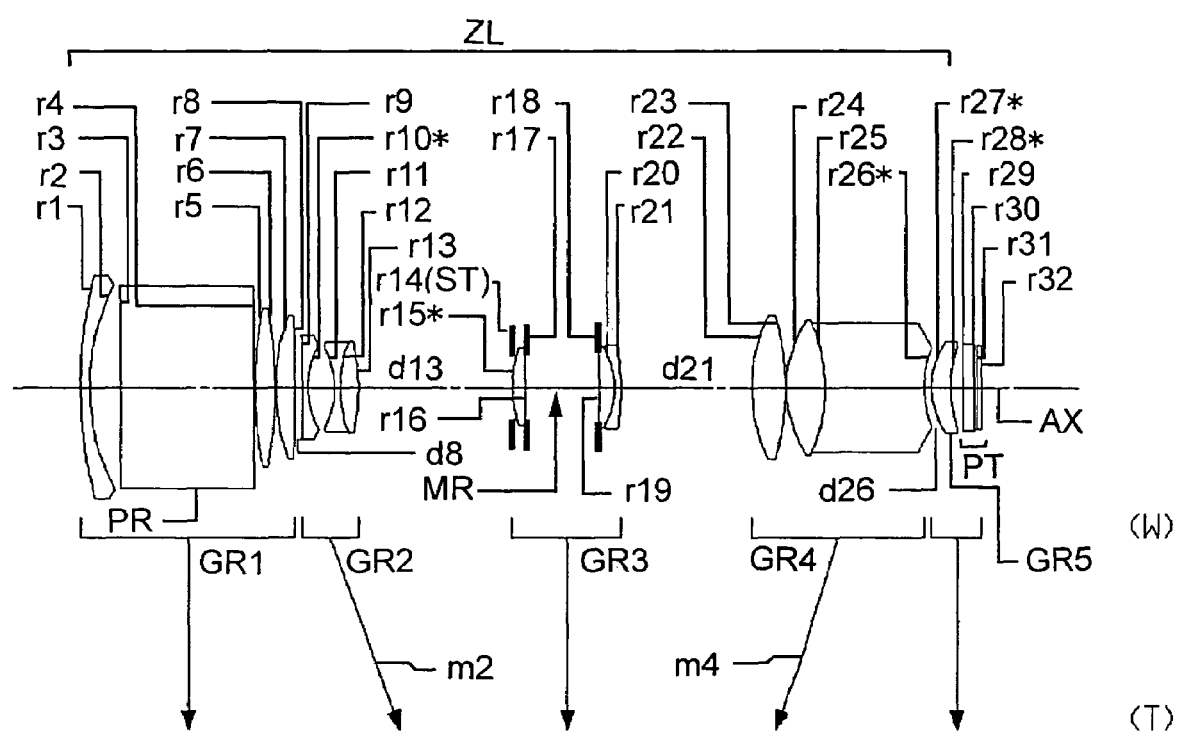
FIG. 3 is a lens construction diagram of a third embodiment (Example 3) according to the present invention.
Figure 4:
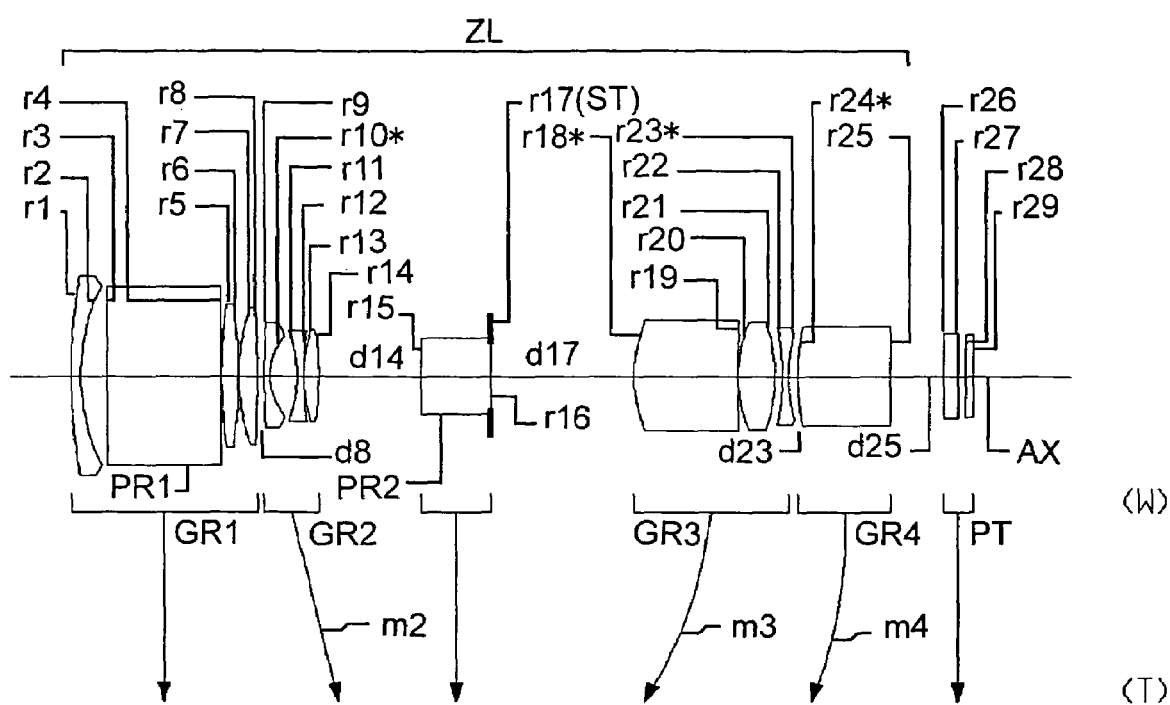
FIG. 4 is a lens construction diagram of a fourth embodiment (Example 4) according to the present invention.
Figure 5:
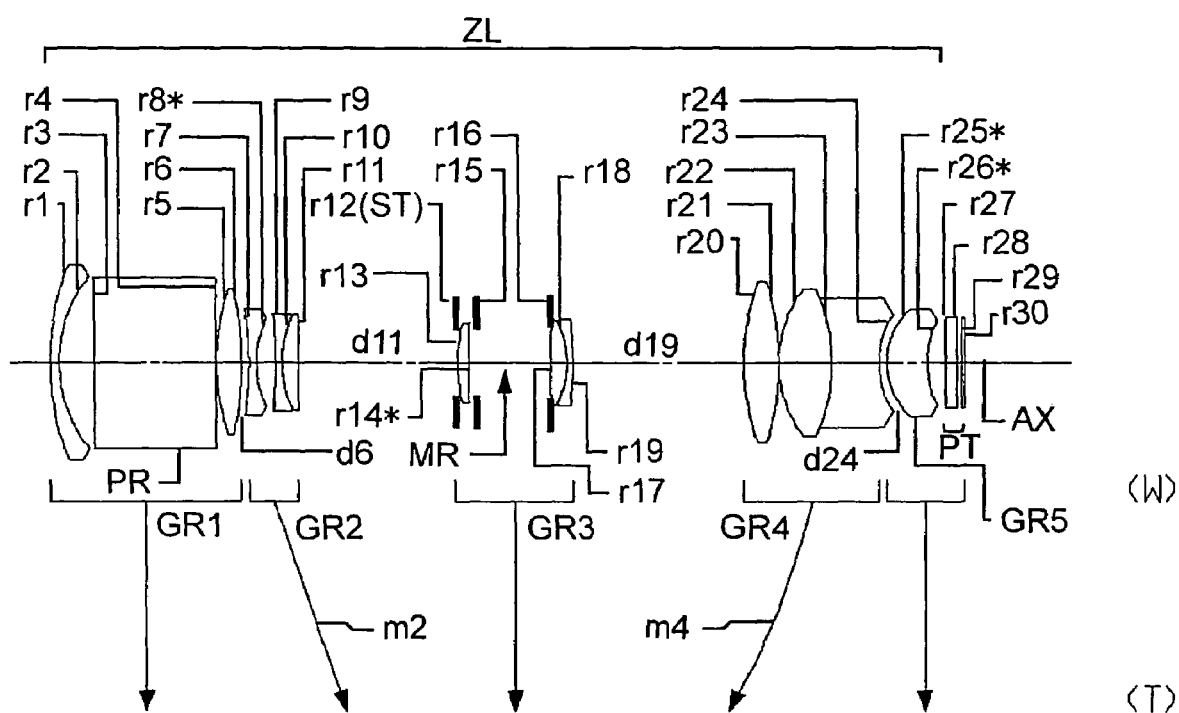
FIG. 5 is a lens construction diagram of a fifth embodiment (Example 5) according to the present invention.
Figure 6A:
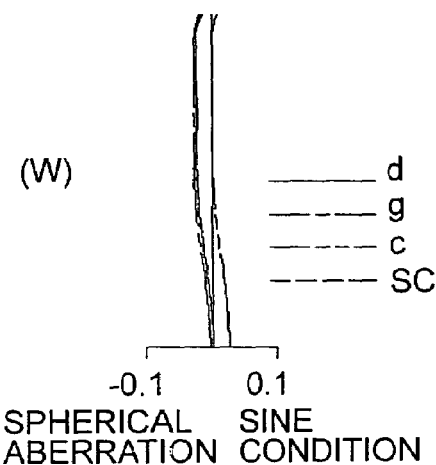
FIGS. 6A to 6I are aberration diagrams of Example 1.
Figure 6B:
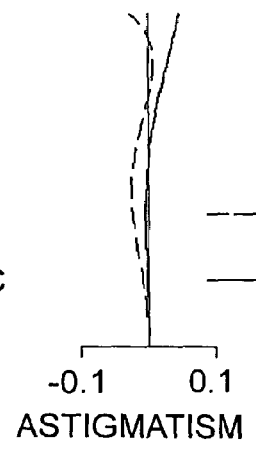
Figure 6C:
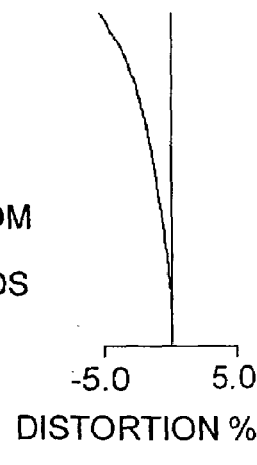
Figure 6D:
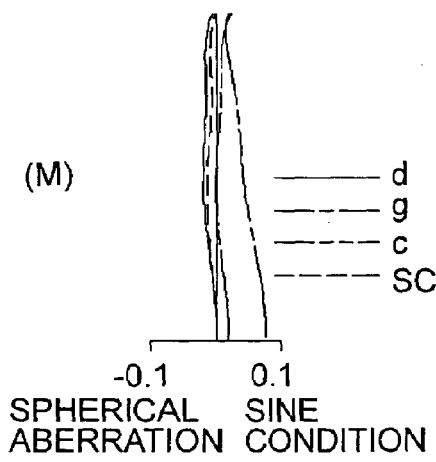
Figure 6E:
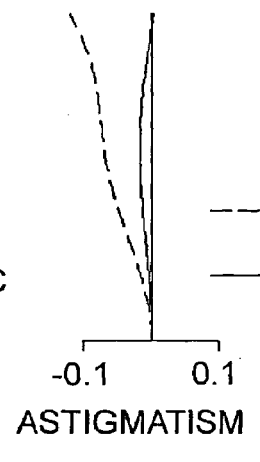
Figure 6F:
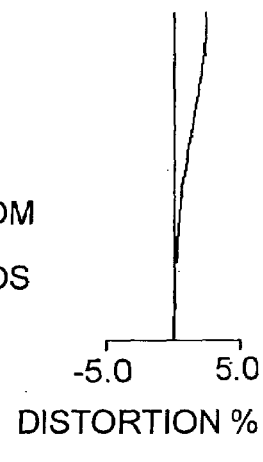
Figure 6G:
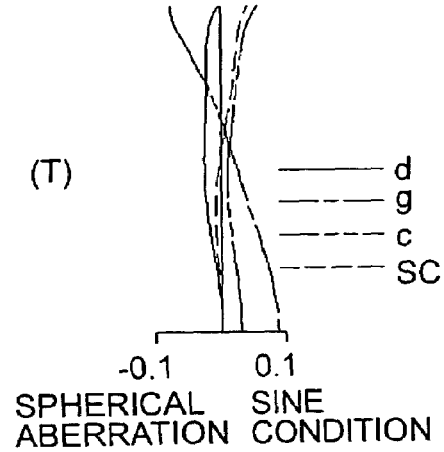
Figure 6H:
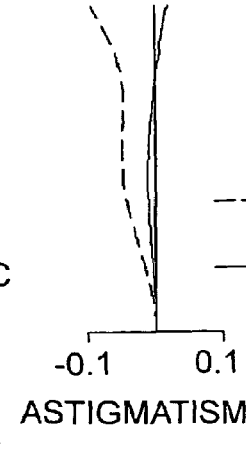
Figure 6I:
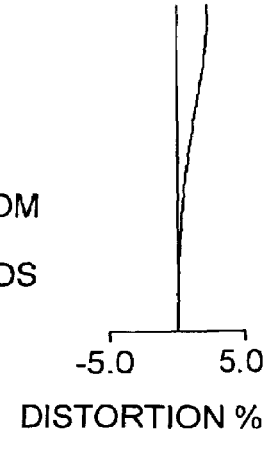
Figure 11:
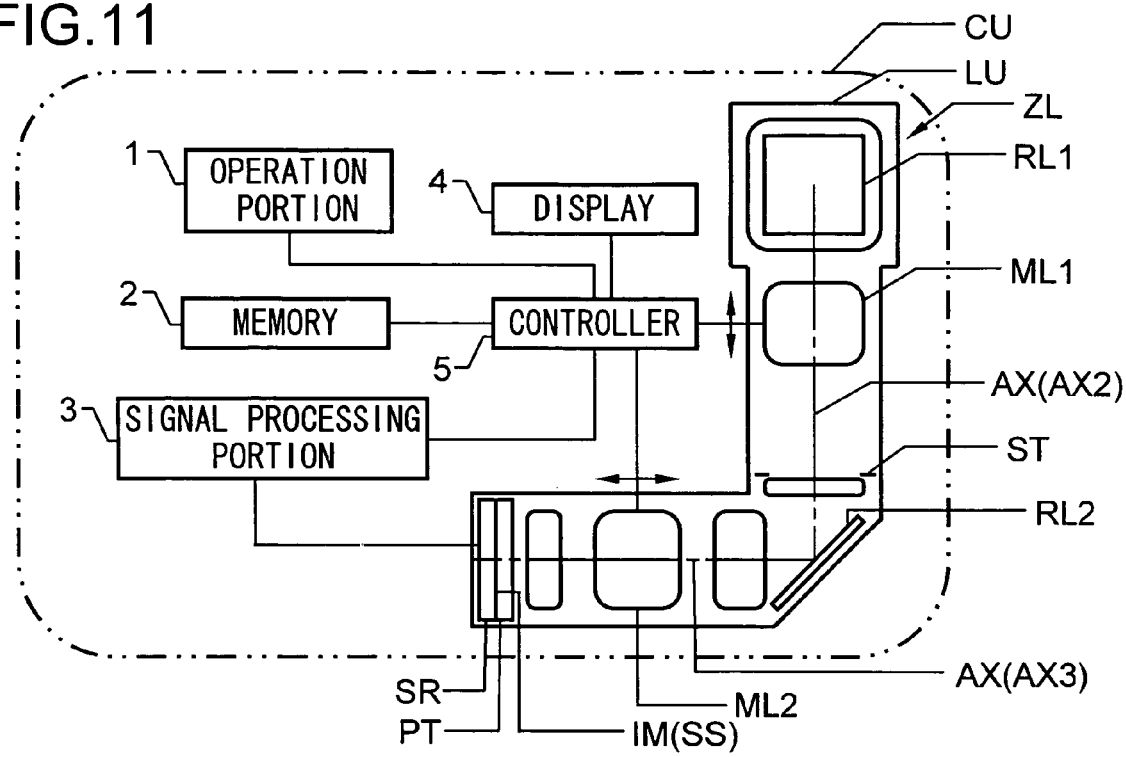
FIG. 11 is a front view schematically and cross-sectionally showing an example of the outline construction of a camera according to the present invention.
Figure 12:
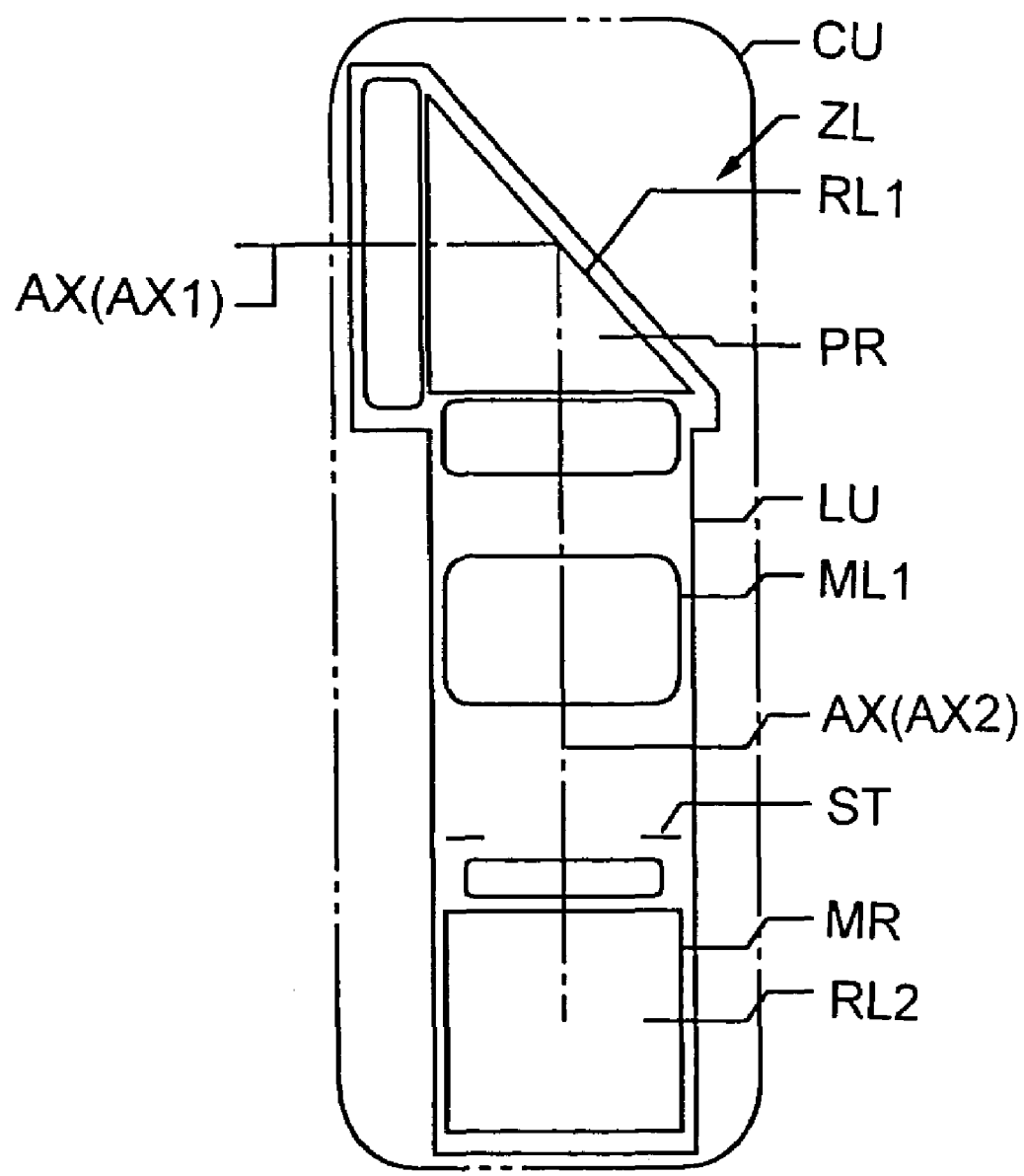
FIG. 12 is a side view schematically and cross-sectionally showing an example of the outline construction of the camera.

FIGS. 11 and 12 schematically and cross-sectionally show examples of the outline construction of a camera CU (corresponding to a digital camera, a digital appliance provided with an image input capability, or the like). FIG. 11 is a front view of the camera CU. FIG. 12 is a side view of the camera CU. An image-taking apparatus LU to be mounted in the camera CU is composed of: from the object (i.e., subject) side thereof, a zoom lens system ZL (corresponding to a variable magnification optical system as an image-taking lens system, ST: aperture stop) for forming an optical image (image surface IM) of an object with a variable magnification; a parallel-plane plate PT (corresponding to an optical filter such as an optical low-pass filter or infrared cut filter arranged as required, the cover glass of an image sensor SR, or the like); and an image sensor SR for converting the optical image IM formed on the light-receiving surface SS thereof by the zoom lens system ZL into an electrical signal. The image-taking apparatus LU is used as a component of the camera CU corresponding to a digital camera, portable data device (i.e., a compact and portable data equipment terminal such as a cellular phone or PDA), or the like. When this image-taking apparatus LU is incorporated in a digital camera, the image-taking apparatus LU is usually arranged inside the body of the camera. Here, the camera capability can be realized in a desired manner that suits particular needs. For example, the image-taking apparatus LU may be built as a unit that is freely detachable from or freely rotatable relative to the body of the camera; or the image-taking apparatus LU may be built as a unit that is freely detachable from or freely rotatable relative to a portable data device (such as a cellular phone or PDA).

Used as the image sensor SR is a solid-state image sensor such as a CCD (charge-coupled device) or CMOS (complementary metal oxide semiconductor) sensor having a plurality of pixels. The optical image formed (on the light-receiving surface SS of the image sensor SR) by the zoom lens system ZL is converted into an electrical signal by the image sensor SR. The signal produced by the image sensor SR is subjected, in a signal processing portion 3, to predetermined digital image processing, image compression processing, and the like as required, and is recorded in a memory 2 (such as a semiconductor memory or an optical disk) as a digital video signal; in some cases, the signal is transferred to another appliance through a cable or after being converted into an infrared signal. A controller 5 is composed of a micro computer and centrally controls an image-taking function, an image reproducing function, a lens transfer system for zooming and focusing, and the like. A display 4 includes a display such as a liquid crystal monitor, and displays an image by using the image signal converted by the image sensor SR or the image data recorded in the memory 2. An operation portion 1 includes an operation member such as operation buttons (for example, a release button), operation dials (such as a photographing mode dial), etc., and transfers to the controller 5 data input by the user's operation through the operation member.

The optical image to be formed by the zoom lens system ZL passes through the optical low-pass filter (corresponding to the parallel-plane plates PTs shown in FIGS. 11 and 12) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moiré. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter in the image-taking lens system. Accordingly, in an image-taking lens apparatus that does not require an optical low-pass filter, simply locating the exit pupil at an appropriate position makes it possible to reduce the back focal length and thereby downsize the image-taking apparatus and the camera incorporating it. Used as the optical low-pass filter is a birefringence-type low-pass filter, phase-type low-pass filter, or the like. Examples of birefringence-type low-pass filters include those made of a birefringent material such as quartz having a crystal axis appropriately aligned in a predetermined direction and those composed of wavelength plates or the like, which change the polarization plane, laid on one another. Examples of phase-type low-pass filters include those that achieve required optical cut-off frequency characteristics by exploiting diffraction.

The zoom lens system ZL includes a plurality of lens units, at least two of which move along an optical axis AX as a first and second movable units ML1 and ML2, and performs magnification variation (i.e. zooming) by changing a distance between at least two of the lens units. In the optical path in the zoom lens system ZL, two planar first and second reflective surfaces RL1 and RL2 are arranged. That is, in the zoom lens system ZL, the optical path is bent twice by the first and second reflective surfaces RL1 and RL2. The optical path is bent by the first and second reflective surfaces RL1 and RL2 so that the zoom lens system ZL can be used as a bending optical system. Here, the light beam is reflected in such a way that the optical axis AX is bent at about ninety degrees (i.e., precisely or substantially ninety degrees).

The optical path is bent twice by the above-mentioned first and second reflective surfaces RL1 and RL2, so that the optical axis AX of the zoom lens system ZL is bent at about ninety degrees each in mutually different directions. Therefore, the optical axis AX of the zoom lens system ZL includes three mutually perpendicular portions, i.e., a first optical axis AX 1 (FIG. 12) as an incident optical axis, a second optical axis AX2 located between the first and second reflective surfaces RL1 and RL2 (FIGS. 11 and 12), and a third optical axis AX 3 (FIG. 11) located in the image sensor SR side of the second reflective surface RL2. The first optical axis AX1 is bent at about ninety degrees by the first reflective surface RL1, as shown in FIG. 12. The second optical axis AX2 is bent at about ninety degrees by the second reflective surface RL2, as shown in FIG. 11. On the second optical axis AX2, there is arranged a first movable unit ML1. On the third optical axis AX3, there is arranged a second movable unit ML2. During magnification variation from the wide-angle end to the telephoto end, the first reflective surface RL1 and the second reflective surface RL2 are respectively kept in fixed positions with respect to the image surface IM, the first movable unit ML1 moves along the second optical axis AX2, and the second movable unit ML2 moves along the third optical axis AX3. The first and second movable units ML 1 and ML2 correspond to movable units of each of embodiments to be described later. The movement of these movable units ML1 and ML2 are controlled by the controller 5.

As described above, providing the first and second reflective surfaces RL1 and RL2 that bend the optical path in the zoom lens system ZL improves the degree of freedom in the arrangement of the image-taking apparatus LU and also permits the downsizing of the image-taking apparatus LU. Then, providing the camera CU with the downsized image-taking apparatus LU permits the downsizing and slimming-down of this camera CU. Specifically, bending the optical axis AX at about ninety degrees from the first optical axis AX1 to the second optical axis AX2 permits slimming-down in the direction of the first optical axis AX1. Bending the optical axis AX at about ninety degrees from the second optical axis AX2 to the third optical axis AX3 permits downsizing of even the zoom lens system ZL that has a long full length and offers high magnification variation ratios. The bending angle of the optical axis AX from the second optical axis AX2 to the third optical axis AX3 is not limited to about ninety degrees. In order to achieve slimming-down in the direction of the first optical axis AX1, however, it is preferable that the second and third optical axes AX2 and AX3 are respectively in planes perpendicular to the first optical axis AX1. Moreover, arranging the first and third optical axes AX1 and AX3 in parallel to each other as well as in perpendicular to the second optical axis AX2, i.e., the substantially C-shaped arrangement of the optical axis AX, permits slimming-down of the horizontal width of the camera CU.

As shown in FIG. 12, the first reflective surface RL1 is composed of a prism PR. The second reflective surface RL2 is composed of a mirror MR. Composing the first reflective surface RL1 with the prism PR permits advantageously achieving downsizing and so on. Composing the second reflective surface RL2 with the mirror ML permits advantageously achieving cost reduction, weight saving, improvement in light usability, and so on. For the first reflective surface RL1 in particular, a prism is more effective in downsizing than a mirror. In the zoom lens system ZL (FIGS. 11 and 12) and the embodiments to be described later (FIGS. 1 to 5), a rectangular prism is used for PR, PR1, and PR2, but the prism to be used is not limited to a rectangular type. For example, a prism may be used which reflects an optical beam in such a way as to bend the optical axis AX of the zoom lens system ZL at about ninety degrees by two or more reflective surfaces. Similarly, the second reflective surface RL2 may be composed of a reflective mirror other than a flat mirror. The optical mechanism for bending the optical path is not limited to reflection, but it can also be refraction, diffraction, or those in combination. That is, a prism and a mirror to be used may include a reflective surface, a refractive surface, a diffractive surface, or those in combination.

The prisms PR, PR1, and PR2, and the mirror MR used in the zoom lens system ZL (FIGS. 11 and 12) and in the embodiments to be described later (FIGS. 1 to 5) do not have optical power (here, the optical power is a quantity defined as the reciprocal of the focal length). However, the prisms PR, PR1, and PR2, and the mirror MR that bend the optical path may be provided with optical power. For example, having the first reflective surface RL1 of the prisms PR and PR1, the second reflective surface RL2 of the prism PR2, a light entrance side surface and a light exit side surface of these prisms PR, PR1, and PR2, the second reflective surface RL2 of the mirror MR, etc. share the optical power of the zoom lens system ZL can reduce the optical power shared by lens elements and thereby improve optical performance. In the embodiments to be described later, the lens elements are arranged in the object side of the prisms PR and PR1. Rather than employing this lens element arrangement, the object side surface (i.e., light entrance side surface) of the prism PR may be provided with a certain degree of curvature to have a negative or positive optical power.

The image-taking lens system to be used in the image-taking apparatus LU is not limited to the zoom lens system ZL. Instead of the zoom lens system ZL, other types of variable magnification optical systems (for example, a variable-focal-length imaging optical system such as a varifocal lens system or a lens element that permits switching among a plurality of focal lengths) may be used as an image-taking lens system. In the image-taking apparatus LU shown in FIGS. 11 and 12, the zoom lens system ZL performs reduced projection from the subject on the enlargement side to the image sensor SR on the reduction side. The use of a display element for displaying a two-dimensional secondary image (for example, liquid crystal display element) instead of the image sensor SR plus the use of the zoom lens system ZL as a projector lens system can provide an image projector for performing enlarged projection from the image display surface on the reduction side to the screen surface on the enlargement side. That is, the zoom lens system ZL of the embodiments to be described later is not limited for use as an image-taking lens system, but favorably usable as a projector lens system.

FIGS. 1 to 5 are lens construction diagrams of zoom lens systems ZL corresponding to first to fifth embodiments, respectively. In each figure, the lens arrangement at the wide-angle end (W) is shown with an optical cross section. For the sake of convenience, the figure shows expanded lens arrangement on one straight line without any bending of the optical axis AX, thus showing no shapes of the prisms PR, PR1 and PR2, and the mirror MR. Accordingly, the axial positions of the first reflective surface RL1 in the prisms PR and PR1 and the second reflective surface RL2 in the prism PR2 respectively lie in the middle between the light entrance side surface and the light exit side surface. The axial position of the second reflective surface RL2 in the mirror MR lies in the middle of a virtual surface around the mirror space. In each of the lens construction diagrams, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here.

In the lens construction diagrams of the first to third embodiments and the fifth embodiment (FIGS. 1 to 3, and FIG. 5), arrows m2 and m4 schematically show movements of the second and the fourth lens units GR2 and GR4, respectively, during zooming from the wide-angle end (W) to the telephoto end (T). Other arrows indicate fixed positions during zooming. In the lens construction diagram of the fourth embodiment (FIG. 4), arrows m2, m3, and m4 schematically show movements of the second, third, and fourth lens units GR, GR3, and GR4, respectively, during zooming from the wide-angle end (W) to the telephoto end (T). Other arrows indicate fixed positions during zooming. In each embodiment, there is arranged between the second and third lens units GR2 and GR3 an aperture stop ST that is kept in a fixed position during zooming.

The zoom lens system ZL of the first to third embodiments, and the fifth embodiment includes: from the object side, a first lens unit GR1 having a positive optical power; a second lens unit GR2 having a negative optical power; a third lens unit GR3 having a positive optical power; a fourth lens unit GR4 having a positive optical power; and a fifth lens unit GR5 having a positive optical power. The zoom lens system ZL of these embodiments has a five-unit zoom construction that achieves zooming by varying spaces among the lens units. Moreover, the zoom lens system ZL of these embodiments employs zoom construction such that the second lens unit GR2 is used as the first movable unit ML1 and the fourth lens unit GR4 is used as the second movable unit ML2. Thus, the second and fourth lens units GR2 and GR4 move during zooming from the wide-angle end (W) to the telephoto end (T). Therefore, movable units include the second and fourth lens units GR2 and GR4 while fixed units include the first, third, and the fifth lens units GR1, GR3, and GR5.

The zoom lens system of the fourth embodiment includes: from the object side, a first lens unit GR 1 having a positive optical power; a second lens unit GR2 having a negative optical power; a third lens unit GR3 having a positive optical power; and a fourth lens unit GR4 having a positive optical power. The zoom lens system ZL of this embodiment has a four-unit zoom construction that achieves zooming by varying spaces among the lens units. Moreover, the zoom lens system ZL of this embodiment employs zoom construction such that the second lens unit GR2 is used as the first movable unit ML1 and the third lens unit GR3 is used as the second movable unit ML2. Thus, the second, third, and the fourth lens units GR2, GR3, and GR4 move during zooming from the wide-angle end (W) to the telephoto end (T). Therefore, movable units include the second, third, and the fourth lens units GR2, GR3, and GR4 while a fixed unit includes the first lens unit GR1. The lens construction of each embodiment will be described in detail hereinafter.

In the first embodiment (FIG. 1), in the five-unit zoom construction composed of a positive, a negative, a positive, a positive, and a positive lens unit, each lens unit is built as follows. The first lens unit GR1 is composed of: from the object side, a negative meniscus lens element concave to the image side; a prism PR; and two biconvex positive lens elements. The second lens unit GR2 is composed of: from the object side, a biconcave negative lens having an aspherical surface on the image side; and a cemented lens element formed by cementing together a biconcave negative lens element and a biconvex positive lens element. The third lens unit GR3 is composed of: from the object side, a biconvex positive lens element having an aspherical surface on the image side; a mirror MR; and a cemented lens element formed by cementing together a biconvex positive lens element and a biconcave negative lens element. In the object side of the third lens unit GR3, there is arranged an aperture stop ST that is kept in a fixed position together with the third lens unit GR3 during zooming. The fourth lens unit GR4 is composed of: from the object side, a biconvex positive lens element having an aspherical surface on the object side; and a negative meniscus lens element concave to the image side. The fifth lens unit GR5 is composed of only a positive meniscus lens element having aspherical surfaces on both sides and convex to the object side. During zooming from the wide-angle end (W) to the telephoto end (T), the second lens unit GR2 monotonously moves toward the image, and the fourth lens unit GR4 monotonously moves toward the object. On the other hand, the first, third, and the fifth lens units GR1, GR3, and GR5, and a parallel flat plate PT are kept in fixed zoom position with respect to the image surface IM.

In the second embodiment (FIG. 2), in the five-unit zoom construction composed of a positive, a negative, a positive, a positive, and a positive lens unit, each lens unit is built as follows. The first lens unit GR1 is composed of: from the object side, a negative meniscus lens element concave to the image side; a prism PR; and two biconvex positive lens elements. The second lens unit GR2 is composed of: from the object side, a biconcave negative lens having an aspherical surface on the image side; and a cemented lens element formed by cementing together a biconcave negative lens element and a biconvex positive lens element. The third lens unit GR3 is composed of: from the object side, a biconvex positive lens element having an aspherical surface on the image side; a mirror MR; and a cemented lens element formed by cementing together a positive meniscus lens element convex to the image side and a negative meniscus lens element concave to the object side. In the object side of the third lens unit GR3, there is arranged an aperture stop ST that is kept in a fixed position together with the third lens unit GR3 during zooming. The fourth lens unit GR4 is composed of: from the object side, a biconvex positive lens; and a cemented lens element formed by cementing together a biconvex positive lens element and a biconcave negative lens element. The fifth lens unit GR5 is composed of only a positive meniscus lens element having aspherical surfaces on both sides and convex to the object side. During zooming from the wide-angle end (W) to the telephoto end (T), the second lens unit GR2 monotonously moves toward the image, and the fourth lens unit GR4 monotonously moves toward the object. On the other hand, the first, third, and the fifth lens units GR1, GR3, and GR5, and a parallel flat plate PT are kept in fixed zoom position with respect to the image surface IM.

In the third embodiment (FIG. 3), in the five-unit zoom construction composed of a positive, a negative, a positive, a positive, and a positive lens unit, each lens unit is built as follows. The first lens unit GR1 is composed of: from the object side, a negative meniscus lens element concave to the image side; a prism PR; and two biconvex positive lens elements. The second lens unit GR2 is composed of: from the object side, a biconcave negative lens having an aspherical surface on the image side; and a cemented lens element formed by cementing together a biconcave negative lens element and a biconvex positive lens element. The third lens unit GR3 is composed of: from the object side, a biconvex positive lens element having an aspherical surface on the object side; a mirror MR; and a cemented lens element formed by cementing together a positive meniscus lens element convex to the image side and a negative meniscus lens element concave to the object side. In the object side of the third lens unit GR3, there is arranged an aperture stop ST that is kept in a fixed position together with the third lens unit GR3 during zooming. The fourth lens unit GR4 is composed of: from the object side, a biconvex positive lens element; and a cemented lens element formed by cementing together a biconvex positive lens element and a biconcave negative lens element having an aspherical surface on the image side. The fifth lens unit GR5 is composed of only a positive meniscus lens element having aspherical surfaces on both sides and convex to the object side. During zooming from the wide-angle end (W) to the telephoto end (T), the second lens unit GR2 monotonously moves toward the image, and the fourth lens unit GR4 monotonously moves toward the object. On the other hand, the first, third, and the fifth lens units GR1, GR3, and GR5, and a parallel flat plate PT are kept in fixed zoom position with respect to the image surface IM.

In the fourth embodiment (FIG. 4), in the four-unit zoom construction composed of a positive, a negative, a positive, and a positive lens unit, each lens unit is built as follows. The first lens unit GR1 is composed of: from the object side, a negative meniscus lens element concave to the image side; a prism PR1; and two biconvex positive lens elements. The second lens unit GR2 is composed of: from the object side, a negative meniscus lens element having an aspherical surface on the image side and concave to the image side; a biconcave negative lens element, and a biconvex positive lens element. The third lens unit GR3 is composed of: from the object side, a positive meniscus lens element having an aspherical surface on the object side and convex to the object side; a biconvex positive lens element; and a biconcave negative lens element having an aspherical surface on the image side. In the object side of the third lens unit GR3, there are arranged a prism PR2 and an aperture stop ST that are kept in fixed zoom position. The fourth lens unit GR4 is composed of only a positive meniscus lens element having an aspherical surface on the object side and convex to the object side. During zooming from the wide-angle end (W) to the telephoto end (T), the second lens unit GR2 monotonously moves toward the image, and the third and fourth lens units GR3 and GR4 monotonously move toward the object. On the other hand, the first lens unit GR1 and a parallel flat plate PT are kept in fixed zoom position with respect to the image surface IM.

In the fifth embodiment (FIG. 5), in the five-unit zoom construction composed of a positive, a negative, a positive, a positive, and a positive lens unit, each lens unit is built as follows. The first lens unit GR1 is composed of: from the object side, a negative meniscus lens element concave to the image side; a prism PR; and a biconvex positive lens element. The second lens unit GR2 is composed of: from the object side, a biconcave negative lens element having an aspherical surface on the image side; and a cemented lens element formed by cementing together a biconcave negative lens element and a biconvex positive lens element. The third lens unit GR3 is composed of: from the object side, a positive meniscus lens element having an aspherical surface on the image side and convex to the object side; a mirror MR; and a cemented lens element formed by cementing together a biconvex positive lens element and a negative meniscus lens element concave to the object side. In the object side of the third lens unit GR3, there is arranged an aperture stop ST that is kept in a fixed position together with the third lens unit GR3 during zooming. The fourth lens unit GR4 is composed of: from the object side, a biconvex positive lens element; and a cemented lens element formed by cementing together a biconvex positive lens element and a biconcave negative lens element. The fifth lens unit GR5 is composed of only a positive meniscus lens element having aspherical surfaces on both sides and convex to the object side. During zooming from the wide-angle end (W) to the telephoto end (T), the second lens unit GR2 monotonously moves toward the image, and the fourth lens unit GR4 monotonously moves toward the object. On the other hand, the first, third, and the fifth lens units GR1, GR3, and GR5, and a parallel flat plate PT are kept in fixed zoom position with respect to the image surface IM.

In the embodiments 1 to 3, and 5, the second lens unit GR2 moves along the second optical axis AX2 and the fourth lens unit GR4 moves along the third optical axis AX3 so as to achieve zooming. In the fourth embodiment, the second lens unit GR2 moves along the second optical axis AX2 and the third and fourth lens units GR3 and GR4 move along the third optical axis AX3 so as to achieve zooming. Such arrangement of a plurality of movable units separately on the optical axes AX2 and AX3 of different directions advantageously permits simplification and downsizing of lens barrel construction. The zoom lens system ZL of each embodiment employs an inner zoom method in which the first lens unit GR1 functions as a fixed unit. Thus no lens protrudes during zooming, thus permitting photographing with a camera always in a flat state.

As described above, any of the embodiments has optical construction including, from the object side, the first reflective surface, the first movable unit, the second reflective surface, and the second movable unit. Each of the embodiments has the variable magnification optical system constructed such that the optical axis is bent at about ninety degrees by the first reflective surface and is further bent by the second reflective surface, and, during magnification variation from the wide-angle end to the telephoto end, the first and second reflective surfaces are kept in fixed positions with respect to the image surface while the first and second movable units move along the optical axes. As described above, bending the optical axis at about ninety degrees by the first reflective surface permits slimming-down in the direction of the incident optical axis with respect to the first reflection. Additionally bending the optical axis by the second reflective surface permits downsizing of even a variable magnification optical system that has a long full length and offers high magnification variation ratios. This permit providing an image-taking apparatus provided with a compact variable magnification optical system that offers high magnification variation ratios. The use of this image-taking apparatus in a digital camera, a digital appliance provided with an image input capability, or the like, therefore, contributes to slimming-down, weight saving, downsizing, and cost reduction of these devices with higher performance and higher functions. The conditions to obtain these effects in a well-balanced manner, to achieve even higher optical performance, etc. will be described hereinafter.

It is preferable that conditional formula (1) below be fulfilled.

$$1.0 < TR12/y'\text{max} < 12.5 \tag{1}$$

where

TR12 represents the distance along the optical axis between the first and second reflective surfaces; and y'max represents the maximum image height.

Conditional formula (1) defines a preferable conditional range of the axial distance between the first and second reflective surfaces (i.e., the length of the second optical axis AX2). The heights of an image-taking apparatus and a camera provided with such an image-taking apparatus (such as a digital camera or digital appliance provided with an image input capability), i.e., the size in the direction of the second optical axis AX2, are limited by the distance between the first and second reflective surfaces. By fulfilling conditional formula (1), it is possible to satisfactorily correct aberrations while achieving downsizing of a camera or the like. If the lower limit of this conditional formula (1) is disregarded, it is advantageous in the downsizing but not preferable since it becomes difficult to correct the aberrations. Specifically, if the lower limit of conditional formula (1) is disregarded, the optical power of the first movable unit increases and the aberrations occurring in the first movable unit become too large, making it difficult to satisfactorily correct the aberrations (spherical aberration and coma aberration in particular) over the entire variable magnification range. By contrast, if the upper limit of conditional formula (1) is disregarded, it becomes difficult to achieve the downsizing though the aberrations can be corrected satisfactorily. Even if slimming-down can be achieved in the direction of the incident optical axis (first optical axis AX1), the size of the camera or the like unfavorably increases in the direction perpendicular to the direction of the incident optical axis.

It is further preferable that conditional formula (1a) below be fulfilled.

$$6.0 < TR12/y'\text{max} < 12.0 \tag{1a}$$

This conditional formula (1a) defines a further preferable conditional range within that defined by conditional formula (1) from the above-mentioned view points and out of other considerations. By fulfilling this conditional formula (1a), it is possible to achieve further downsizing.

It is preferable that conditional formula (2) below be fulfilled.

$$1.0 < TR2i/y'\text{max} < 20.0 \tag{2}$$

where TR2i represents the distance along the optical axis between the second reflective surface and the image surface.

Conditional formula (2) defines a preferable conditional range of the axial distance between the second reflective surface and the image surface (i.e., the length of the third optical axis AX3). The widths of an image-taking apparatus and a camera provided with such an image-taking apparatus (such as a digital camera or digital appliance provided with an image input capability), i.e. the size in the direction of the third optical axis AX3, are limited by the distance between the second reflective surface and the image surface. By fulfilling conditional formula (2), it is possible to satisfactorily correct the aberrations while achieving downsizing of a digital camera or the like in the direction of the third optical axis. If the lower limit of this conditional formula (2) is disregarded, it is advantageous in the downsizing but not preferable since it becomes difficult to correct the aberrations. Specifically, if the lower limit of conditional formula (2) is disregarded, the optical power of the second movable unit increases and the aberrations occurring in the second movable unit become too large, making it difficult to satisfactorily correct the aberrations (spherical aberration and coma aberration in particular) over the entire variable magnification range. By contrast, if the upper limit of conditional formula (2) is disregarded, even if the downsizing can be achieved in the directions of the first optical axis AX1 (incident optical axis) and the second optical axis AX2, the size of the digital camera or the like unfavorably increases in the direction of the third optical axis AX3.

It is further preferable that conditional formula (2a) below be fulfilled.

$$6.0 < TR2i/y'\text{max} < 17.0 \tag{2a}$$

This conditional formula (2a) defines a further preferable conditional range within that defined by conditional formula (2) from the above-mentioned view points and out of other considerations. By fulfilling this conditional formula (2a), it is possible to achieve further downsizing.

It is preferable that conditional formula (3) below be fulfilled.

$$0.1 < (\beta 2t/\beta 2w)/(ft/fw) < 0.95 \tag{3}$$

where
- β2t represents the lateral magnification of the first movable unit at the telephoto end when focused at infinity;
- β2w represents the lateral magnification of the first movable unit at the wide-angle end when focused at infinity;
- ft represents the focal length of the entire variable magnification optical system at the telephoto end; and
- fw represents the focal length of the entire variable magnification optical system at the wide-angle end.

In conditional formula (3), β2t/β2w represents magnification variation shared by the first movable unit, and ft/fw represents the magnification variation ratio of the entire variable magnification optical system. Conditional formula (3) defines a preferable condition to be fulfilled in regard to balance in sharing of magnification variation between the first and second movable units. If the upper limit of this conditional formula (3) is disregarded, the magnification variation shared by the first movable unit increases. Thus, the amount of movement made by the first movable unit during the magnification variation becomes too large, thus increasing the size of a digital camera or the like in the direction of the second optical axis AX2. If the digital camera or the like is to be downsized in the direction of the optical axis AX2, the optical power of the first movable unit increases, the aberrations (spherical aberration and coma aberration in particular) become too large making it difficult to correct the aberrations, and the sensitivity to a decentering error increases. By contrast, if the lower limit of conditional formula (3) is disregarded, the magnification variation shared by the first movable unit decreases while the magnification variation shared by the second movable unit increases. Thus, the amount of movement made by the second movable unit during the magnification variation becomes too large, thus increasing the size of the digital camera or the like in the direction of the third optical axis AX3. If the digital camera or the like is to be downsized in the direction of the third optical axis AX3, the optical power of the second movable unit becomes too large, making it difficult to correct the aberrations (spherical aberration and coma aberration in particular), and the sensitivity to a decentering error also increases, which are not preferable.

It is further preferable that conditional formula (3a) below be fulfilled.

$$0.3 < (\beta 2t/\beta 2w)/(ft/fw) < 0.8 \tag{3a}$$

This conditional formula (3a) defines a further preferable conditional range within that defined by conditional formula (3) from the above-mentioned view points and out of other considerations. By fulfilling this conditional formula (3a), it is possible to achieve still higher performance, etc.

As in each embodiment, in order to obtain favorable balance among a high magnification variation ratio, compactness, and optical performance, it is preferable that a variable magnification optical system represented by the zoom lens system ZL includes, from the object side, at least: the first lens unit having a positive optical power; the second lens unit having a negative optical power; the third lens unit having a positive optical power; and the fourth lens unit having a positive optical power, and that the first movable unit be the second lens unit and the second movable unit be the third or fourth lens unit. It is further preferable that the first lens unit have the first reflective surface, and that the second reflective surface be included in the third lens unit as in the embodiments 1 to 3, and 5 or between the second and third lens units as in the fourth embodiment. Such construction permits providing an even more compact variable magnification optical system that offers even higher magnification variation ratios. As in the embodiments 1 to 3, and 5, the construction such that the aperture stop is located between the second and third lens units is effective in reducing lens diameter, aperture stop diameter, and so on. As in the fourth embodiment, the construction such that the aperture stop is located between the second and third lens units but closer to the third lens unit is effective in improving the degree of freedom in the shutter unit arrangement, and so on.

It is preferable that conditional formula (4) below be fulfilled.

$$1.5 < TL/ft < 4.0 \tag{4}$$

where TL represents the distance along the optical axis between the surface closest to the object side within the variable magnification optical system and the image surface.

Conditional formula (4) defines a preferable conditional range in regard to optical full length. If the upper limit of this conditional formula (4) is disregarded, although it is preferable in correcting the aberrations, it is not preferable since the size of the entire lens system becomes too large. By contrast, if the lower limit of conditional formula (4) is disregarded, the optical power of the first lens unit increases when the first lens unit has a positive optical power, for example. This makes it difficult to correct the aberrations and increases the sensitivity of the first lens unit to a decentering error, which is not preferable. Therefore, as in each embodiment, it is preferable that the first lens unit having a positive optical power be disposed closest to the object and be provided with the first reflective surface.

It is further preferable that conditional formula (4a) below be fulfilled.

$$2.0 < TL/ft < 3.5 \tag{4a}$$

This conditional formula (4a) defines a further preferable conditional range within that defined by conditional formula (4) from the above-mentioned view points and out of other considerations. By fulfilling this conditional formula (4a), it is possible to achieve further downsizing, higher performance, and so on.

In order to achieve a higher magnification variation ratio by balancing between the higher performance and the downsizing, it is preferable that conditional formula (5) below be fulfilled.

$$4.2 \leq ZR \tag{5}$$

where ZR represent a magnification variation ratio.

For the construction around the second reflective surface, it is preferable that, as in the embodiments 1 to 3, and 5, a positive lens kept in the fixed position during magnification variation be included in the object side of the second reflective surface. This construction suppresses the height of incidence of an optical ray on the second reflective surface, and decreases the space required for bending the optical path, thus permitting the downsizing of the entire lens system and also permitting satisfactory correction of the aberrations (spherical surface in particular) at the telephoto end.

In the embodiments, the zoom lens system ZL is composed solely of refractive lens elements, which deflect incident light by refraction (i.e. lens elements of the type that deflects light at the interface between two media having different refractive indices). It is possible, however, to replace any of these lens elements with a lens element, such as a diffractive lens element which deflects incident light by diffraction, a refractive/diffractive hybrid lens element which deflects incident light by diffraction and refraction combined together, or a gradient index lens element which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material. In addition to the aperture stop ST used as an optical element other than the lens elements, a beam restricting plate (e.g., flare cutter) or the like for cutting unnecessary light may be arranged in the zoom lens system ZL of each embodiment as necessary.

EXAMPLES

Hereinafter, the construction and other features of practical examples of the zoom lens system embodying the present invention will be presented with reference to their construction data and other data. Examples 1 to 5 presented below are numerical examples corresponding to the first to fifth embodiments, respectively, described hereinbefore, and therefore the optical construction diagrams (FIGS. 1 to 5) of the first to fifth embodiments also show the lens construction of Examples 1 to 5, respectively.

Tables 1 to 10 show the construction data of Examples 1 to 5. Table 11 shows the values of the conditional formulae as actually observed in each example. In the basic optical construction (with i representing the surface number) as shown in tables 1, 3, 5, 7, and 9, ri (i=1, 2, 3, ... ) represents the radius of curvature (in mm) of the i-th surface from the object side, di (i=1, 2, 3, ... ) represents the axial distance (in mm) between the i-th and (i+1)-th surfaces from the object side, and Ni (i=1, 2, 3, ... ) and vi (i=1, 2, 3, ... ) respectively represent the refractive index (Nd) for the d-line and the Abbe number (vd) of the optical material filling the axial distance di. The axial distance di that changes during zooming is the variable air distance among the wide angle end (the shortest-focal-length state, W), the middle position (the middle-focal length state, M), and the telephoto end (the longest-focal-length state, T). Numerals f and FNO respectively represent the focal length (in mm) and the f-number of the entire system at the different focal lengths (W, M, and T).

A surface of which the radius of curvature ri is marked with an asterisk (*) is an aspherical surface (a refractive optical surface having an aspherical shape, a surface exerting a refracting effect equivalent to that of an aspherical surface, or the like), of which the surface shape is defined by formula (AS) below. Tables 2, 4, 6, 8, and 10 show the aspherical surface data of the respective examples. It should be noted that any coefficient that is not shown equals 0, and that, for all the data, "E-n" represents "×10$^{-n}$".

$$X(H) = (C0 \cdot H)/\{1+\sqrt{(1-\epsilon \cdot C0^2 \cdot H^2)}\} + \Sigma(Aj \cdot H^j) \quad (AS)$$

where
X(H) represents the displacement along the optical axis AX at the height H (relative to the vertex);
H represents the height in a direction perpendicular to the optical axis AX;
C0 represents the paraxial curvature (=1/ri);
$\epsilon$ represents the quadric curved surface parameter; and
Aj represents the aspherical surface coefficient of the j-th order.

FIGS. 6A to 6I through FIGS. 10A to 10I are aberration diagrams of Examples 1 through 5, respectively, when focused at infinity. Of these aberration diagrams, those with numbers suffixed with A, B, or C show the aberrations observed at (W) representing the wide angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration, those with numbers suffixed with B, E, or H show astigmatism, and those with numbers suffixed with C, F, or I show distortion. FNO represents the F number, and Y' (in mm) represents the maximum image height y'max (corresponding to the distance from the optical axis) on the light-receiving surface SS of the image sensor SR. In the spherical aberration diagrams, a solid line d represents the spherical aberration (in mm) for the d-line, a chain single-dashed line g represents the spherical aberration (in mm) for the g-line, and a chain double-dashed line c represents the spherical aberration (in mm) for the c-line. A broken line SC represents the sine condition (in mm). In the astigmatism diagrams, a broken line DM represents the astigmatism (in mm) for the d-line on the meridional surface, and a solid line DS represents the astigmatism (in mm) for the d-line on the sagittal surface. In the distortion diagrams, a solid line represents the distortion (in %) with respect to the d-line.

TABLE 1

| | Example 1 | Focal Length Condition f [mm] FNO | | (W)~(M)~(T) 6.32~18.97~30.35 3.28~3.52~3.60 | |
|---|---|---|---|---|---|
| i | ri [mm] | di [mm] | Ni | vi | Symbol, etc. |
| 1 | 68.493 | 1.397 | 1.84666 | 23.82 | GR1 (+) |
| 2 | 17.707 | 2.200 | | | |
| 3 | ∞ | 12.500 | 2.00330 | 28.27 | PR |
| 4 | ∞ | 0.365 | | | |
| 5 | 50.523 | 3.000 | 1.48749 | 70.44 | |
| 6 | −42.158 | 0.100 | | | |
| 7 | 24.121 | 2.600 | 1.63854 | 55.45 | |
| 8 | −67.388 | 0.766~12.438~16.228 | | | |
| 9 | −28.068 | 0.720 | 1.83500 | 42.98 | GR2(−) |
| 10 | 7.792 * | 1.862 | | | |
| 11 | −13.364 | 0.720 | 1.48749 | 70.44 | |
| 12 | 12.277 | 1.915 | 1.84666 | 23.82 | |
| 13 | −54.824 | 16.433~4.760~0.970 | | | |
| 14 | ∞ | 0.542 | | | ST |
| 15 | 14.298 | 1.799 | 1.69350 | 53.34 | GR3(+) |
| 16 | −66.519 * | 0.261 | | | |
| 17 | ∞ | 8.009 | | | MR |
| 18 | ∞ | 0.287 | | | |
| 19 | 19.873 | 2.788 | 1.48749 | 70.44 | |
| 20 | −9.845 | 0.850 | 1.84666 | 23.82 | |
| 21 | 61.589 | 11.705~4.318~3.400 | | | |
| 22 | 12.703 * | 2.200 | 1.63854 | 55.45 | GR4(+) |
| 23 | −46.367 | 0.681 | | | |
| 24 | 11.820 | 2.600 | 1.83500 | 42.98 | |
| 25 | 7.782 | 1.793~9.180~10.097 | | | |
| 26 | 18.591 * | 1.500 | 1.62017 | 24.01 | GR5(+) |
| 27 | 24.197 * | 1.000 | | | |
| 28 | ∞ | 2.520 | 1.51680 | 64.20 | PT |
| 29 | ∞ | 1.801 | | | |
| 30 | ∞ | | | | IM(SR) |

TABLE 2

Example 1
Aspherical Surface Data of Surface i (*)

|  | Surface 10 | Surface 16 | Surface 22 | Surface 26 | Surface 27 |
|---|---|---|---|---|---|
| $\epsilon$ | 1.0000 | 1.0000 | 1.0000 | 1.0000 | 1.0000 |
| A4 | −0.19726774E−03 | 0.26552667E−04 | −0.10014386E−03 | −0.55015256E−03 | −0.69115524E−03 |
| A6 | −0.10834606E−05 | 0.28022973E−05 | −0.76613594E−07 | 0.34670516E−04 | 0.83980496E−04 |
| A8 | −0.31122907E−07 | −0.30988356E−06 | −0.12954227E−08 | −0.28145872E−05 | −0.72232890E−05 |
| A10 |  | 0.16425696E−07 |  | −0.92198129E−07 | 0.31526505E−08 |
| A12 |  | −0.32975417E−09 |  | 0.48053815E−08 | 0.58135006E−08 |

TABLE 3

Example 2

| Focal Length Condition f [mm] FNO | | | (W)~(M)~(T) 7.92~17.42~38.33 2.80~3.60~4.90 | | |
|---|---|---|---|---|---|
| i | ri [mm] | di [mm] | Ni | vi | Symbol, etc. |
| 1 | 38.841 | 1.200 | 1.84666 | 23.78 | GR1 (+) |
| 2 | 20.838 | 4.355 | | | |
| 3 | ∞ | 15.445 | 1.84666 | 23.78 | PR |
| 4 | ∞ | 0.100 | | | |
| 5 | 50.752 | 2.410 | 1.49700 | 81.61 | |
| 6 | −53.687 | 0.100 | | | |
| 7 | 22.010 | 2.548 | 1.49700 | 81.61 | |
| 8 | −126.047 | 1.029~8.027~13.423 | | | |
| 9 | −77.552 | 0.800 | 1.80610 | 40.72 | GR2(−) |
| 10 | 9.329 * | 2.898 | | | |
| 11 | −13.208 | 0.800 | 1.72916 | 54.67 | |
| 12 | 10.389 | 2.280 | 1.84666 | 23.78 | |
| 13 | −36.359 | 14.294~7.296~1.900 | | | |
| 14 | ∞ | 0.100 | | | ST |
| 15 | 19.620 | 1.586 | 1.69350 | 53.34 | GR3(+) |
| 16 | −65.325 * | 0.100 | | | |
| 17 | ∞ | 8.509 | | | MR |
| 18 | ∞ | 1.279 | | | |
| 19 | −33.561 | 1.884 | 1.48749 | 70.44 | |
| 20 | −8.781 | 0.800 | 1.84666 | 23.78 | |
| 21 | −19.545 | 14.255~7.285~1.000 | | | |
| 22 | 31.181 | 3.551 | 1.63854 | 55.45 | GR4(+) |
| 23 | −25.439 | 0.100 | | | |
| 24 | 15.532 | 4.334 | 1.48749 | 70.44 | |
| 25 | −19.181 | 9.816 | 1.83481 | 42.72 | |
| 26 | 12.295 | 1.000~7.970~14.255 | | | |
| 27 | 10.049 * | 2.422 | 1.62017 | 24.01 | GR5(+) |
| 28 | 18.823 * | 1.386 | | | |
| 29 | ∞ | 1.500 | 1.51680 | 64.20 | PT |
| 30 | ∞ | 0.500 | | | |
| 31 | ∞ | 0.500 | 1.51680 | 64.20 | |
| 32 | ∞ | 1.002 | | | |
| 33 | ∞ | | | | IM(SR) |

TABLE 5

Example 3

| Focal Length Condition f [mm] FNO | | | (W)~(M)~(T) 7.91~20.60~53.62 2.80~3.60~4.90 | | |
|---|---|---|---|---|---|
| i | ri [mm] | di [mm] | Ni | vi | Symbol, etc. |
| 1 | 60.024 | 1.200 | 1.84666 | 23.78 | GR1 (+) |
| 2 | 30.011 | 4.209 | | | |
| 3 | ∞ | 18.591 | 1.84666 | 23.78 | PR |
| 4 | ∞ | 0.100 | | | |
| 5 | 53.655 | 2.734 | 1.49700 | 81.61 | |
| 6 | −60.633 | 0.100 | | | |
| 7 | 29.688 | 2.476 | 1.48749 | 70.44 | |
| 8 | −1164.972 | 1.000~12.585~19.909 | | | |
| 9 | −906.027 | 0.800 | 1.80610 | 40.72 | GR2(−) |
| 10 | 10.805 * | 3.591 | | | |
| 11 | −13.012 | 0.800 | 1.72916 | 54.67 | |
| 12 | 17.295 | 2.420 | 1.84666 | 23.78 | |
| 13 | −27.745 | 20.809~9.225~1.900 | | | |
| 14 | ∞ | 0.100 | | | ST |
| 15 | 18.128 * | 1.599 | 1.58913 | 61.25 | GR3(+) |
| 16 | −562.993 | 0.100 | | | |
| 17 | ∞ | 9.780 | | | MR |
| 18 | ∞ | 0.100 | | | |
| 19 | −2983.205 | 2.113 | 1.49700 | 81.61 | |
| 20 | −10.941 | 0.800 | 1.83400 | 37.34 | |
| 21 | −47.672 | 18.057~10.187~1.000 | | | |
| 22 | 22.371 | 4.684 | 1.48749 | 70.44 | GR4(+) |
| 23 | −34.162 | 0.100 | | | |
| 24 | 16.846 | 5.242 | 1.51680 | 64.20 | |
| 25 | −23.369 | 13.588 | 1.80610 | 40.72 | |
| 26 | 15.694 * | 1.000~8.871~18.057 | | | |
| 27 | 9.383 * | 2.649 | 1.53048 | 55.72 | GR5(+) |
| 28 | 12.912 * | 1.808 | | | |
| 29 | ∞ | 1.500 | 1.51680 | 64.20 | PT |
| 30 | ∞ | 0.500 | | | |
| 31 | ∞ | 0.500 | 1.51680 | 64.20 | |
| 32 | ∞ | 1.002 | | | |
| 33 | ∞ | | | | IM(SR) |

TABLE 4

Example 2
Aspherical Surface Data of Surface i (*)

|  | Surface 10 | Surface 16 | Surface 27 | Surface 28 |
|---|---|---|---|---|
| $\epsilon$ | 1.0000 | 1.0000 | 1.0000 | 1.0000 |
| A4 | −0.30504146E−04 | 0.95693369E−05 | −0.16102072E−03 | −0.12126190E−03 |
| A6 | −0.87109540E−06 | 0.38981932E−06 | −0.38127423E−05 | 0.12411844E−05 |
| A8 | 0.61640122E−07 | 0.97560606E−08 | 0.19142668E−07 | −0.66858332E−06 |
| A10 | −0.81344166E−09 | −0.34077716E−08 | −0.15490140E−07 | −0.10013489E−07 |
| A12 | | 0.11688253E−09 | 0.13511561E−09 | 0.37722472E−09 |

TABLE 6

Example 3
Aspherical Surface Data of Surface i (*)

| | Surface 10 | Surface 15 | Surface 26 | Surface 27 | Surface 28 |
|---|---|---|---|---|---|
| ε | 1.0000 | 1.0000 | 1.0000 | 1.0000 | 1.0000 |
| A4 | −0.32858252E−04 | −0.66708457E−05 | 0.12713680E−03 | −0.14341127E−03 | −0.21916599E−03 |
| A6 | −0.34682241E−06 | 0.14542536E−06 | 0.13110898E−05 | 0.30325945E−05 | 0.84954457E−05 |
| A8 | 0.15757473E−07 | −0.21146496E−08 | −0.20735913E−07 | −0.14878515E−06 | −0.69404007E−06 |
| A10 | −0.19113182E−09 | 0.23874310E−10 | 0.16118391E−09 | −0.63944916E−08 | −0.33190203E−08 |
| A12 | | 0.25713689E−19 | −0.12895118E−18 | 0.13525060E−09 | 0.29244007E−09 |

TABLE 7

Example 4

| | | Focal Length Condition f [mm] FNO | (W)~(M)~(T) 7.91~17.41~38.31 2.80~3.60~4.90 | | |
|---|---|---|---|---|---|
| i | ri [mm] | di [mm] | Ni | vi | Symbol, etc. |
| 1 | 84.577 | 1.200 | 1.84666 | 23.78 | GR1 (+) |
| 2 | 27.047 | 3.731 | | | |
| 3 | ∞ | 16.069 | 1.84666 | 23.78 | PR1 |
| 4 | ∞ | 0.100 | | | |
| 5 | 74.524 | 2.310 | 1.49700 | 81.61 | |
| 6 | −68.367 | 0.100 | | | |
| 7 | 28.918 | 2.489 | 1.72916 | 54.67 | |
| 8 | −228.521 | 1.000~10.039~14.024 | | | |
| 9 | 147.163 | 0.800 | 1.80610 | 40.72 | GR2(−) |
| 10 | 9.120 * | 3.716 | | | |
| 11 | −16.948 | 0.800 | 1.72916 | 54.67 | |
| 12 | 42.631 | 0.100 | | | |
| 13 | 21.656 | 2.090 | 1.84666 | 23.78 | |
| 14 | −43.102 | 14.024~4.986~1.000 | | | |
| 15 | ∞ | 9.402 | 1.84666 | 23.78 | PR2 |
| 16 | ∞ | 0.0001 | | | |
| 17 | ∞ | 20.319~14.351~2.000 | | | ST |
| 18 | 17.930 * | 14.393 | 1.58913 | 61.25 | GR3(+) |
| 19 | 115.918 | 0.100 | | | |
| 20 | 18.794 | 4.944 | 1.49700 | 81.61 | |
| 21 | −23.675 | 1.044 | | | |
| 22 | −32.079 | 0.800 | 1.62017 | 24.01 | |
| 23 | 24.977 * | 1.304~5.594~10.471 | | | |
| 24 | 34.024 * | 12.925 | 1.53048 | 55.72 | GR4(+) |
| 25 | 2087.160 | 7.520~9.198~16.671 | | | |
| 26 | ∞ | 2.000 | 1.51680 | 64.20 | PT |
| 27 | ∞ | 1.000 | | | |
| 28 | ∞ | 1.000 | 1.51680 | 64.20 | |
| 29 | ∞ | 1.006 | | | |
| 30 | ∞ | | | | IM(SR) |

TABLE 9

Example 5

| | | Focal Length Condition f [mm] FNO | (W)~(M)~(T) 7.91~17.41~38.31 2.80~3.60~4.90 | | |
|---|---|---|---|---|---|
| i | ri [mm] | di [mm] | Ni | vi | Symbol, etc. |
| 1 | 31.540 | 1.200 | 1.84666 | 23.78 | GR1 (+) |
| 2 | 17.143 | 4.350 | | | |
| 3 | ∞ | 15.450 | 1.84666 | 23.78 | PR |
| 4 | ∞ | 0.100 | | | |
| 5 | 29.691 | 3.099 | 1.62041 | 60.34 | |
| 6 | 41.640 | 1.000~12.478~18.942 | | | |
| 7 | −33.460 | 0.800 | 1.80610 | 40.72 | GR2(−) |
| 8 | 11.873 * | 2.346 | | | |
| 9 | −92.867 | 0.800 | 1.49700 | 81.61 | |
| 10 | 13.221 | 2.037 | 1.84666 | 23.78 | |
| 11 | 306.305 | 19.692~8.215~1.750 | | | |
| 12 | ∞ | 0.250 | | | ST |
| 13 | 23.194 | 1.327 | 1.69350 | 53.34 | GR3(+) |
| 14 | 148.069 * | 1.058 | | | |
| 15 | ∞ | 9.042 | | | MR |
| 16 | ∞ | 0.100 | | | |
| 17 | 175.051 | 1.999 | 1.49700 | 81.61 | |
| 18 | −11.017 | 0.800 | 1.83400 | 37.34 | |
| 19 | −37.247 | 21.407~13.207~1.000 | | | |
| 20 | 29.943 | 4.195 | 1.69680 | 55.46 | GR4(+) |
| 21 | −35.444 | 0.100 | | | |
| 22 | 15.316 | 6.593 | 1.49700 | 81.61 | |
| 23 | −22.056 | 6.000 | 1.83400 | 37.34 | |
| 24 | 11.463 | 1.000~9.200~21.407 | | | |
| 25 | 9.220 * | 5.252 | 1.53048 | 55.72 | GR5(+) |
| 26 | 15.034 * | 2.130 | | | |
| 27 | ∞ | 1.500 | 1.51680 | 64.20 | PT |
| 28 | ∞ | 0.500 | | | |
| 29 | ∞ | 0.500 | 1.51680 | 64.20 | |
| 30 | ∞ | 1.007 | | | |
| 31 | ∞ | | | | IM(SR) |

TABLE 8

Example 4
Aspherical Surface Data of Surface i (*)

| | Surface 10 | Surface 18 | Surface 23 | Surface 24 |
|---|---|---|---|---|
| ε | 1.0000 | 1.0000 | 1.0000 | 1.0000 |
| A4 | 0.76161613E−05 | −0.14332058E−04 | 0.93863801E−04 | −0.15625831E−04 |
| A6 | 0.47486136E−06 | −0.59081345E−07 | 0.91807861E−06 | 0.96102058E−06 |
| A8 | 0.66501660E−09 | 0.45921757E−09 | −0.75793945E−08 | −0.39124586E−07 |
| A10 | 0.25798836E−09 | −0.25118972E−10 | 0.39187865E−10 | 0.90973752E−09 |
| A12 | 0.33913668E−21 | 0.19996924E−12 | 0.18776420E−11 | −0.84517278E−11 |

TABLE 10

Example 5
Aspherical Surface Data of Surface i (*)

| | Surface 8 | Surface 14 | Surface 25 | Surface 26 |
|---|---|---|---|---|
| ε | 1.0000 | 1.0000 | 1.0000 | 1.0000 |
| A4 | −0.61889369E−04 | 0.30392887E−07 | 0.84666067E−04 | 0.49837555E−03 |
| A6 | −0.12045504E−06 | −0.11137736E−05 | −0.61694939E−05 | −0.14056013E−04 |
| A8 | −0.61071053E−09 | 0.11306331E−06 | 0.28317006E−06 | 0.65370859E−06 |
| A10 | −0.47366140E−10 | −0.57814511E−08 | −0.58799088E−08 | −0.11463617E−07 |
| A12 | | 0.11688377E−09 | 0.54691935E−10 | 0.14460588E−09 |

TABLE 11

| Conditional Formula | | Ex. 1 | Ex. 2 | Ex. 3 | Ex. 4 | Ex. 5 |
|---|---|---|---|---|---|---|
| (1), (1a) | TR12/y' max | 11.49 | 9.12 | 11.29 | 8.95 | 9.95 |
| (2), (2a) | TR2i/y' max | 9.36 | 10.80 | 13.01 | 16.23 | 12.80 |
| (3), (3a) | (β2t/β2w)/(ft/fw) | 0.64 | 0.49 | 0.40 | 0.45 | 0.38 |
| (4), (4a) | TL/ft | 2.80 | 2.69 | 2.31 | 3.30 | 3.02 |
| (5) | ZR | 4.80 | 4.84 | 6.78 | 4.84 | 4.84 |

What is claimed is:

1. A variable magnification optical system for forming an optical image of an object on a light-receiving surface of an image sensor with a variable magnification, the variable magnification optical system including an optical construction comprising, from an object side, a first reflective surface, a first movable unit, a second reflective surface, and a second movable unit, wherein an optical axis is bent at substantially ninety degrees by the first reflective surface and is further bent by the second reflective surface, wherein, during magnification variation from a wide-angle end to a telephoto end, the first and second reflective surfaces are kept in fixed positions with respect to an image surface, and the first and second movable units move along the optical axis, and wherein conditional formula (1) below is fulfilled:

$$1.0 < TR12/y'\text{max} < 12.5 \qquad (1)$$

where

TR12 represents a distance along the optical axis between the first and second reflective surfaces, and y'max represents a maximum image height.

2. The variable magnification optical system according to claim 1, wherein conditional formula (2) below is fulfilled:

$$1.0 < TR2i/y'\text{max} < 20.0 \qquad (2)$$

where

TR2i represents a distance along the optical axis between the second reflective surface and the image surface.

3. The variable magnification optical system according to claim 1, wherein conditional formula (3) below is fulfilled:

$$0.1 < (\beta 2t/\beta 2w)/(ft/fw) < 0.95 \qquad (3)$$

where

β2t represents a lateral magnification of the first movable unit at the telephoto end when focused at infinity;

β2w represents a lateral magnification of the first movable unit at the wide-angle end when focused at infinity;

ft represents a focal length of the entire variable magnification optical system at the telephoto end; and fw represents a focal length of the entire variable magnification optical system at the wide-angle end.

4. The variable magnification optical system according to claim 1, comprising, from the object side, at least: a first lens unit having a positive optical power; a second lens unit having a negative optical power, a third lens unit having a positive optical power, and a fourth lens unit having a positive optical power, wherein the first movable unit is the second lens unit, and wherein the second movable unit is the third or fourth lens unit.

5. The variable magnification optical system according to claim 1, wherein conditional formula (4) below is fulfilled:

$$1.5 < TL/ft < 4.0 \qquad (4)$$

where ft represents a focal length of the entire variable magnification optical system at the telephoto end; and TL represents a distance along the optical axis between a surface closest to the object side within the variable magnification optical system and the image surface.

6. The variable magnification optical system according to claim 5, wherein the first lens unit having a positive optical power is disposed closest to the object side, and wherein the first reflective surface is included in the first lens unit.

7. The variable magnification optical system according to claim 1, wherein conditional formula (5) below is fulfilled:

$$4.2 \leq ZR \qquad (5)$$

where

ZR represents a magnification variation ratio.

8. The variable magnification optical system according to claim 1, wherein conditional formula (1a) below is fulfilled;

$$6.0 < TR12/y'\text{max} < 12.0. \qquad (1a)$$

9. The variable magnification optical system according to claim 1, wherein conditional formula (2a) below is fulfilled:

$$6.0 < TR2i/y'\text{max} < 17.0 \qquad (2a)$$

where
TR2i represents a distance along the optical axis between the second reflective surface and the image surface.

10. The variable magnification optical system according to claim 1,
wherein conditional formula (3a) below is fulfilled:

$$0.3<(\beta 2t/\beta 2w)/(ft/fw)<0.8 \qquad (3a)$$

where
$\beta 2t$ represents a lateral magnification of the first movable unit at the telephoto end when focused at infinity;
$\beta 2w$ represents a lateral magnification of the first movable unit at the wide-angle end when focused at infinity;
ft represents a focal length of the entire variable magnification optical system at the telephoto end; and
fw represents a focal length of the entire variable magnification optical system at the wide-angle end.

11. The variable magnification optical system according to claim 1,
wherein conditional formula (4a) below is fulfilled:

$$2.0<TL/ft<3.5 \qquad (4a)$$

where
ft represent a focal length of the entire variable magnification optical system at the telephoto end; and
TL represents a distance along the optical axis between a surface closest to the object side within the variable magnification optical system and the image surface.

12. An image-taking apparatus comprising:
a variable magnification optical system for forming an optical image of an object with a variable magnification; and
an image sensor for converting the optical image into an electrical signal,
wherein the variable magnification optical system includes an optical construction comprising, from an object side, a first reflective surface, a first movable unit, a second reflective surface, and a second movable unit,
wherein an optical axis is bent at substantially ninety degrees by the first reflective surface and is further bent by the second reflective surface,
wherein, during magnification variation from a wide-angle end to a telephoto end, the first and second reflective surfaces are kept in fixed positions with respect to an image surface, and the first and second movable units move along the optical axis, and
wherein conditional formula (1) below is fulfilled:

$$1.0<TR12/y'max<12.5 \qquad (1)$$

where
TR12 represents a distance along the optical axis between the first and second reflective surfaces, and
y'max represents a maximum image height.

13. The image-taking apparatus according to claim 12, wherein conditional formula (2) below is fulfilled:

$$1.0<TR2i/y'max<20.0 \qquad (2)$$

where
TR2i represents a distance along the optical axis between the second reflective surface and the image surface.

14. The image-taking apparatus according to claim 12, wherein conditional formula (3) below is fulfilled:

$$0.1<(\beta 2t/\beta 2w)/(ft/fw)<0.95 \qquad (3)$$

where
$\beta 2t$ represents a lateral magnification of the first movable unit at the telephoto end when focused at infinity;
$\beta 2w$ represents a lateral magnification of the first movable unit at the wide-angle end when focused at infinity;
ft represents a focal length of the entire variable magnification optical system at the telephoto end; and
fw represents a focal length of the entire variable magnification optical system at the wide-angle end.

15. The image-taking apparatus according to claim 12, comprising, from the object side, at least: a first lens unit having a positive optical power; a second lens unit having a negative optical power, a third lens unit having a positive optical power, and a fourth lens unit having a positive optical power,
wherein the first movable unit is the second lens unit, and
wherein the second movable unit is the third or fourth lens unit.

16. The image-taking apparatus according to claim 12, wherein conditional formula (4) below is fulfilled:

$$1.5<TL/ft<4.0 \qquad (4)$$

where
ft represents a focal length of the entire variable magnification optical system at the telephoto end; and
TL represents a distance along the optical axis between a surface closest to the object side within the variable magnification optical system and the image surface.

17. The image-taking apparatus according to claim 16,
wherein the first lens unit having a positive optical power is disposed closest to the object side, and
wherein the first reflective surface is included in the first lens unit.

18. The image-taking apparatus according to claim 12, wherein conditional formula (5) below is fulfilled:

$$4.2\leq ZR \qquad (5)$$

where
ZR represents a magnification variation ratio.

19. A camera comprising an image-taking apparatus for optically taking in an image of a subject and then outputting an electrical signal,
wherein the image-taking apparatus comprises: a variable magnification optical system for forming an optical image of an object with a variable magnification; and
an image sensor for converting the optical image into an electrical signal,
wherein the variable magnification optical system includes an optical construction comprising, from an object side, a first reflective surface, a first movable unit, a second reflective surface, and a second movable unit,
wherein an optical axis is bent at substantially ninety degrees by the first reflective surface and is further bent by the second reflective surface, wherein, during magnification variation from a wide-angle end to a telephoto end, the first and second reflective surfaces are kept in fixed positions with respect to an image surface, and the first and second movable units move along the optical axis, and wherein conditional formula (1) below is fulfilled:

$$1.0 < TR12/y'\max < 12.5 \tag{1}$$

where

TR12 represents a distance along the optical axis between the first and second reflective surfaces, and y'max represents a maximum image height.

20. The camera according to claim 19, wherein conditional formula (2) below is fulfilled:

$$1.0 < TR2i/y'\max < 20.0 \tag{2}$$

where

TR2i represents a distance along the optical axis between the second reflective surface and the image surface.

* * * * *